(12) United States Patent
Hendry et al.

(10) Patent No.: US 12,170,777 B2
(45) Date of Patent: Dec. 17, 2024

(54) VIDEO DECODING METHOD AND DEVICE FOR CODING CHROMA QUANTIZATION PARAMETER OFFSET-RELATED INFORMATION

(71) Applicant: LG ELECTRONICS INC., Seoul (KR)

(72) Inventors: Hendry Hendry, Seoul (KR); Jie Zhao, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 17/774,434

(22) PCT Filed: Nov. 4, 2020

(86) PCT No.: PCT/KR2020/015288
§ 371 (c)(1),
(2) Date: May 4, 2022

(87) PCT Pub. No.: WO2021/091214
PCT Pub. Date: May 14, 2021

(65) Prior Publication Data
US 2022/0408093 A1   Dec. 22, 2022

Related U.S. Application Data

(60) Provisional application No. 62/931,192, filed on Nov. 5, 2019.

(51) Int. Cl.
*H04N 19/132* (2014.01)
*H04N 19/105* (2014.01)
*H04N 19/176* (2014.01)
*H04N 19/186* (2014.01)
(Continued)

(52) U.S. Cl.
CPC ......... *H04N 19/132* (2014.11); *H04N 19/105* (2014.11); *H04N 19/176* (2014.11);
(Continued)

(58) Field of Classification Search
CPC .. H04N 19/132; H04N 19/105; H04N 19/176; H04N 19/186; H04N 19/46; H04N 19/70; H04N 19/124
See application file for complete search history.

(56) References Cited

U.S. PATENT DOCUMENTS

2015/0365671 A1* 12/2015 Pu .................. H04N 19/46
375/240.03
2018/0091829 A1* 3/2018 Liu ................. H04N 19/436
(Continued)

FOREIGN PATENT DOCUMENTS

KR   1020170016856 A   2/2017
KR   1020180018532 A   2/2018
(Continued)

OTHER PUBLICATIONS

Jie Zhao, "AHG15: On CU Adaptive Chroma QP Offset Signalling", JVET-P0436, Joint Video Experts Team (JVET) of ITU-T SG 16 WP 3 and ISO/IEC JTC 1/SC 29/WG 11 16th Meeting: Geneva, CH, pp. 1-5, Oct. 7, 2019 See pp. 3-4.

*Primary Examiner* — Richard A Hansell, Jr.
(74) *Attorney, Agent, or Firm* — Bryan Cave Leighton Paisner LLP

(57) ABSTRACT

A video decoding method performed by a decoding device according to the present document is characterized by comprising: a step for acquiring information for a chroma quantization parameter (QP) offset for the current picture; and a step for acquiring chroma QP offset index information for a current chroma block in the current picture, wherein the information for the chroma QP offset includes chroma QP offset list length information, information for a chroma QP offset list length information, information for a chroma QP (Continued)

offset list is acquired on the basis of the chroma QP offset list length information, and the chroma QP offset index information is acquired on the basis of the chroma QP offset list length information.

10 Claims, 8 Drawing Sheets

(51) Int. Cl.
*H04N 19/46* (2014.01)
*H04N 19/70* (2014.01)

(52) U.S. Cl.
CPC ........... *H04N 19/186* (2014.11); *H04N 19/46* (2014.11); *H04N 19/70* (2014.11)

(56) References Cited

U.S. PATENT DOCUMENTS

| | | | |
|---|---|---|---|
| 2019/0158854 A1 | 5/2019 | He et al. | |
| 2021/0218968 A1* | 7/2021 | Chernyak | H04N 19/124 |
| 2022/0070460 A1* | 3/2022 | Ikonin | H04N 19/132 |
| 2022/0210448 A1* | 6/2022 | Zhu | H04N 19/86 |
| 2022/0272347 A1* | 8/2022 | Zhu | H04N 19/132 |

FOREIGN PATENT DOCUMENTS

| | | | | |
|---|---|---|---|---|
| KR | 1020190057159 A | | 5/2019 | |
| WO | WO-2016201032 A1 * | 12/2016 | ........... | H04N 19/119 |
| WO | WO-2020057662 A1 * | 3/2020 | ........... | H04N 19/105 |
| WO | WO-2021062225 A1 * | 4/2021 | ........... | H04N 19/124 |

\* cited by examiner

VIDEO DECODING METHOD AND DEVICE FOR CODING CHROMA QUANTIZATION PARAMETER OFFSET-RELATED INFORMATION

BACKGROUND OF THE DISCLOSURE

Field of the Disclosure

This document relates to image coding technology, and more particularly, to an image decoding method for coding chroma quantization parameter offset related information in an image coding system, and an apparatus for the image decoding method.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and apparatus for increasing data coding efficiency of deriving a quantization parameter for a chroma component.

According to an embodiment of the present document, there is provided an image decoding method performed by a decoding apparatus. The method includes obtaining information on a chroma Quantization Parameter (QP) offset for a current picture, obtaining chroma QP offset index information for a current chroma block in the current picture, deriving a chroma QP offset for the current chroma block based on the chroma QP offset index information and the information on the chroma QP offset, deriving a chroma QP of the current chroma block based on the chroma QP offset, deriving a residual sample of the current chroma block based on the chroma QP, and generating a reconstructed sample of the current chroma block based on the residual sample, wherein the information on the chroma QP offset includes length information of a chroma QP offset list, wherein information on the chroma QP offset list is obtained based on the length information of the chroma QP offset list, and wherein the chroma QP offset index information is obtained based on the length information of the chroma QP offset list.

According to another embodiment of the present document, there is provided a decoding apparatus performing image decoding. The decoding apparatus includes an entropy decoder obtaining information on a chroma QP offset for a current picture, and obtaining chroma QP offset index information for a current chroma block in the current picture, a residual processor deriving a chroma QP offset for the current chroma block based on the chroma QP offset index information and the information on the chroma QP offset, deriving a chroma QP of the current chroma block based on the chroma QP offset, and deriving a residual sample of the current chroma block based on the chroma QP, and an adder generating a reconstructed sample of the current chroma block based on the residual sample, wherein the information on the chroma QP offset includes length information of a chroma QP offset list, wherein information on the chroma QP offset list is obtained based on the length information of the chroma QP offset list, and wherein the chroma QP offset index information is obtained based on the length information of the chroma QP offset list.

According to another embodiment of the present document, there is provided a video encoding method performed by an encoding apparatus. The method includes generating information on a chroma QP offset for a current picture, generating chroma QP offset index information for a current chroma block in the current picture, and encoding image information including the chroma QP offset index information and the information on the chroma QP offset, wherein the information on the chroma QP offset includes length information of a chroma QP offset list, wherein information on the chroma QP offset list is obtained based on the length information of the chroma QP offset list, and wherein the chroma QP offset index information is signaled based on the length information of the chroma QP offset list.

According to another embodiment of the present document, there is provided a video encoding apparatus. The encoding apparatus includes an entropy encoder generating information on a chroma QP offset for a current picture, generating chroma QP offset index information for a current chroma block in the current picture, and encoding image information including the chroma QP offset index information and the information on the chroma QP offset, wherein the information on the chroma QP offset includes length information of a chroma QP offset list, wherein information on the chroma QP offset list is obtained based on the length information of the chroma QP offset list, and wherein the chroma QP offset index information is signaled based on the length information of the chroma QP offset list.

According to another embodiment of the present document, there is provided a computer-readable digital storage medium storing a bitstream, when executed, causing a decoding apparatus to perform an image decoding method. In the computer-readable digital storage medium, the image decoding method includes obtaining information on a chroma QP offset for a current picture, obtaining chroma QP offset index information for a current chroma block in the current picture, deriving a chroma QP offset for the current chroma block based on the chroma QP offset index information and the information on the chroma QP offset, deriving a chroma QP of the current chroma block based on the chroma QP offset, deriving a residual sample of the current chroma block based on the chroma QP, and generating a reconstructed sample of the current chroma block based on the residual sample, wherein the information on the chroma QP offset includes length information of a chroma QP offset list, wherein the information on the chroma QP offset list is obtained based on the length information of the chroma QP offset list, and wherein the chroma QP offset index information is obtained based on the length information of the chroma QP offset list.

According to the present document, a chroma QP offset of a current chroma block may be derived without having to signal chroma QP offset information in a PPS syntax, thereby reducing an amount of bits of information for deriving the chroma QP offset and improving coding efficiency.

According to the present document, information indicating a length of a chroma QP offset list may be signaled without an additional condition, thereby reducing an amount of bits of information for deriving the chroma QP offset and improving coding efficiency.

DESCRIPTION OF EMBODIMENTS

Figure 1:
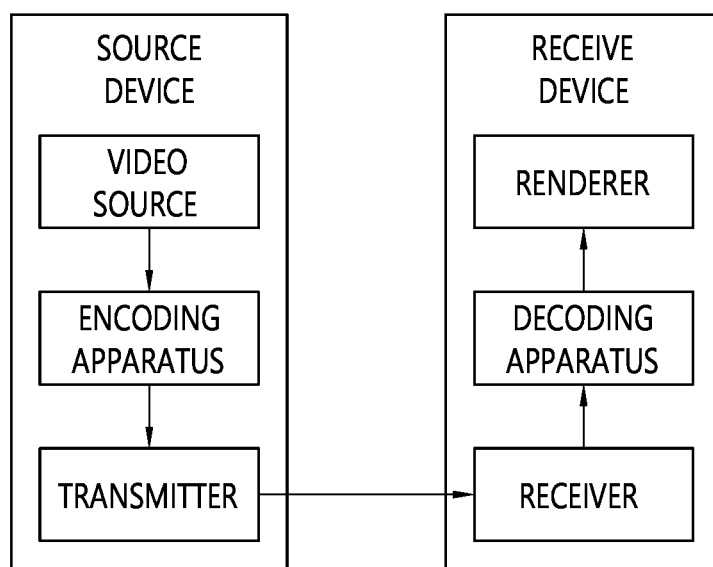
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
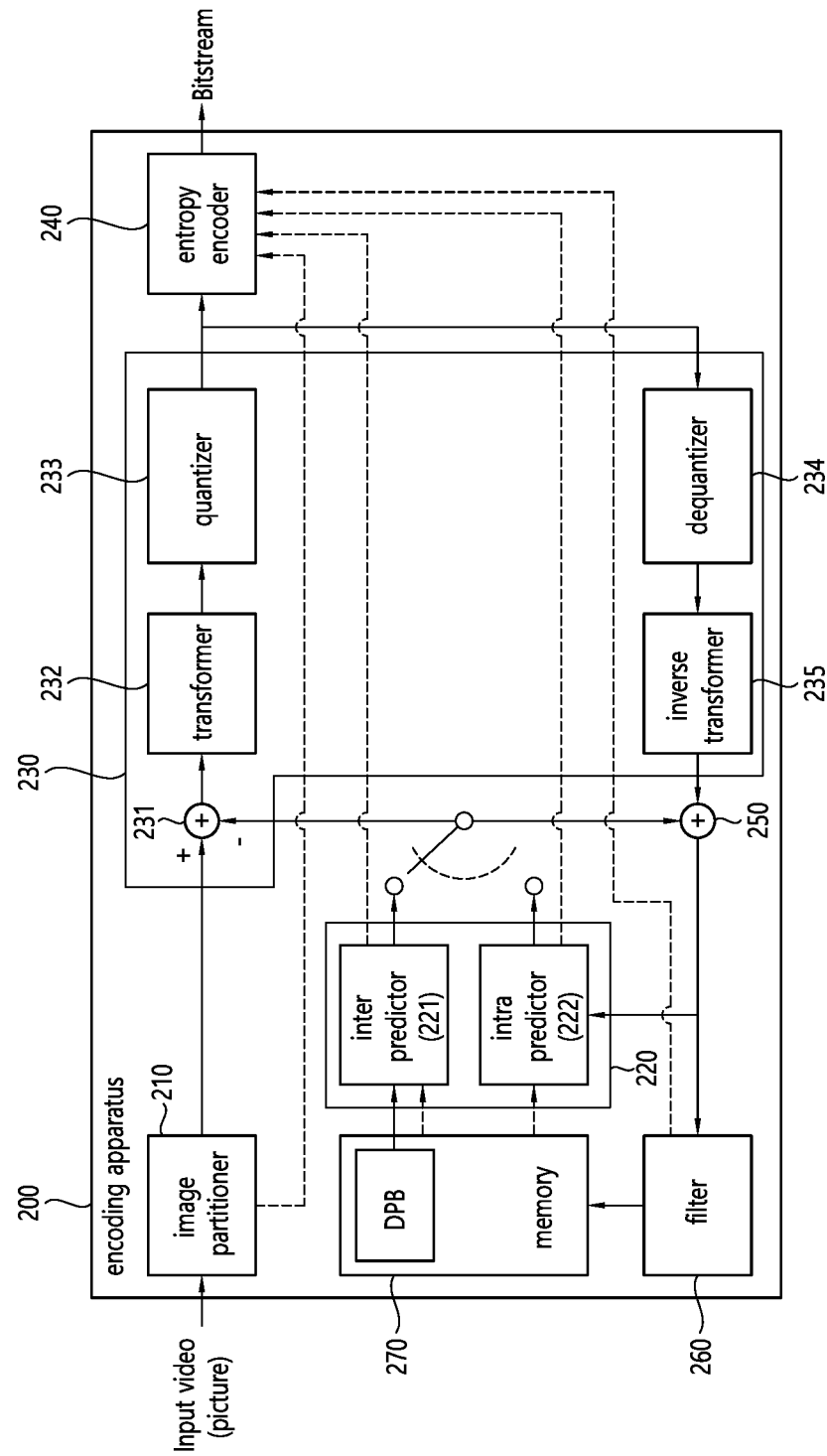
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
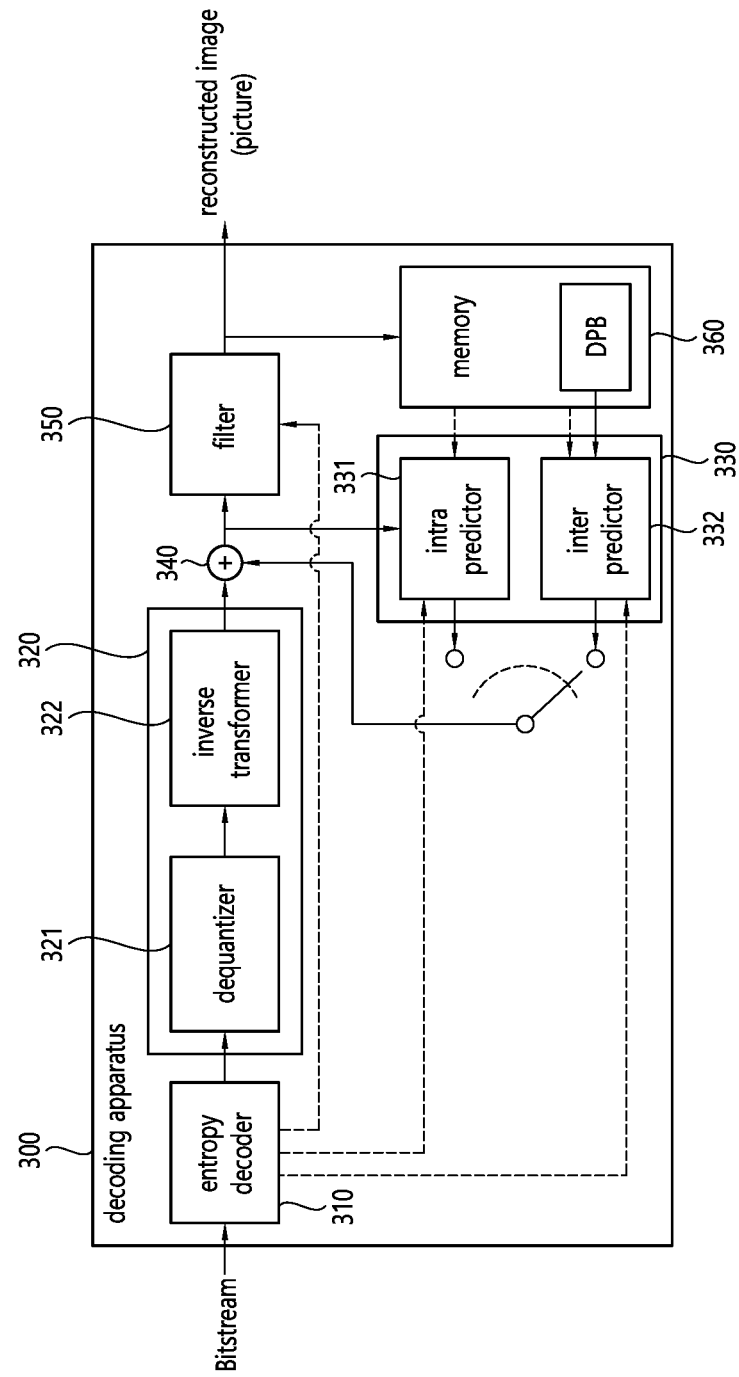
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, a high level syntax (HLS) for video/image coding may be coded/signaled. In addition, a coded picture may consist of one or more slices. For example, a parameter describing the coded picture may be signaled in a picture header (PH), and a parameter describing a slice may be signaled in a slice header (SH). In addition, the PH may be transferred in its own NAL unit type, and the SH may be present at a start portion of an NAL unit including a payload of a slice (i.e., slice data).

Also, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter $QP_Y$ for a luma component and a quantization parameter $QP_C$ for a chroma component may be different configured.

In a quantization process, a transform coefficient C may be an input, a quantization ratio ($Q_{step}$) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C' may be multiplied by a quantization ratio ($Q_{step}$), and a reconstructed transform coefficient C" may be obtained based on the result of the multiplication. In this case, a level scale may be derived based on a quantization parameter, the level scale may be applied to the quantized transform coefficient C', and a reconstructed transform coefficient C" may be derived. The reconstructed transform coefficient C" may have some difference from the first transform coefficient C due to a loss in the transform and/or quantization process. Accordingly, dequantization is performed in the encoding apparatus as in the decoding apparatus.

In addition, the QP may be used to derive other parameters for image/video coding. When color components of a bitstream are not coded separately and the bitstream is not a monochrome bitstream (i.e., ChromaArrayType is not equal to 0), QP offsets for chroma components may be signaled in a picture parameter set (PPS) as shown in the table below.

TABLE 1

| | Descriptor |
|---|---|
| pic_parameter_set_rbsp( ) { | |
| ... | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
|   if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
|   } | |
| ... | |
| } | |

Semantics for syntax elements shown in Table 1 above may be as follows.

For example, the syntax elements pps_cb_qp_offset and pps_cr_qp_offset may specify offsets for the luma quantization parameter Qp'y used for deriving $Qp'_{Cb}$ and $Qp'_{Cr}$, respectively. The values of pps_cb_qp_offset and pps_cr_qp_offset may be in the range of −12 to +12. In addition, when ChromaArrayType is equal to 0, pps_cb_qp_offset and pps_cr_qp_offset may not be used in the decoding process, and a decoder may ignore values of the syntax elements.

In addition, for example, the syntax element pps_joint_cbcr_qp_offset_present_flag may specify whether pps_joint_cbcr_qp_offset_value and joint_cbcr_qp_offset_list[i] are present in the PPS RBSP syntax structure. For example, pps_joint_cbcr_qp_offset_present_flag equal to 1 may specify that pps_joint_cbcr_qp_offset_value and joint_cbcr_qp_offset_list[i] are present in the PPS RBSP syntax structure. In addition, for example, pps_joint_cbcr_qp_offset_present_flag equal to 0 may specify that pps_joint_cbcr_qp_offset_value and joint_cbcr_qp_offset_list[i] are not present in the PPS RBSP syntax structure. In addition, when ChromaArrayType is equal to 0 or sps_joint_cbcr_enabled_flag is equal to 0, the value of pps_joint_cbcr_qp_offset_present_flag may be equal to 0.

In addition, for example, the syntax element pps_joint_cbcr_qp_offset_value may specify an offset for the luma quantization parameter $Qp'_Y$ used for deriving $Qp'_{CbCr}$. The value of pps_joint_cbcr_qp_offset_value may be in the range of −12 to +12. In addition, when ChromaArrayType is equal to 0 or sps_joint_cbcr_enabled_flag is equal to 0, the pps_joint_cbcr_qp_offset_value may not be used in the decoding process and the decoder may ignore the value of the syntax element. In addition, when pps_joint_cbcr_qp_offset_present_flag is equal to 0, pps_joint_cbcr_qp_offset_value may not be present, and the value of pps_joint_cbcr_qp_offset_value may be inferred to be equal to 0.

In addition, for example, the syntax element pps_slice_chroma_qp_offsets_present_flag may specify whether the syntax elements slice_cb_qp_offset and slice_cr_qp_offset are present in the associated slice headers. For example, pps_slice_chroma_qp_offsets_present_flag equal to 1 may specify that slice_cb_qp_offset and slice_cr_qp_offset are present in the associated slice headers. In addition, for example, pps_slice_chroma_qp_offsets_present_flag equal to 0 may specify that slice_cb_qp_offset and slice_cr_qp_offset are not present in the associated slice headers. In addition, when ChromaArrayType is equal to 0, pps_slice_chroma_qp_offsets_present_flag may be equal to 0.

In addition, for example, the syntax element pps_cu_chroma_qp_offset_list_enabled_flag may specify whether pic_cu_chroma_qp_offset_subdiv_intra_slice and pic_cu_chroma_qp_offset_subdiv_inter_slice are present in a picture header (PH) referring to a PPS and whether cu_chroma_qp_offset_flag is present in a transform unit syntax and a palette coding syntax. For example, pps_cu_chroma_qp_offset_list_enabled_flag equal to 1 may specify that the pic_cu_chroma_qp_offset_subdiv_intra_slice and the pic_cu_chroma_qp_offset_subdiv_inter_slice are present in the PH referring to the PPS and that cu_chroma_qp_offset_flag is present in the transform unit syntax and the palette coding syntax. In addition, for example, pps_cu_chroma_qp_offset_list_enabled_flag equal to 0 may specify that the pic_cu_chroma_qp_offset_subdiv_intra_slice and the pic_cu_chroma_qp_offset_subdiv_inter_slice are not present in the PH referring to the PPS and that the cu_chroma_qp_offset_flag is not present in the transform unit syntax and the palette coding syntax. In addition, when ChromaArrayType is equal to 0, a requirement of bitstream conformance may be that the value of pps_cu_chroma_qp_offset_list_enabled_flag is equal to 0.

In addition, for example, the syntax element chroma_qp_offset_list_len_minus1 plus 1 may specify the number of syntax elements cb_qp_offset_list[i], cr_qp_offset_list[i], and joint_cbcr_qp_offset_list[i] which are present in the PPS RBSP syntax structure. That is, for example, the syntax element chroma_qp_offset_list_len_minus1 plus 1 may specify a length of cb_qp_offset_list(chroma Cb QP offset list), cr_qp_offset_list(chroma Cr QP offset list)m and joint_cbcr_qp_offset_list(joint CbCr QP offset list). The value of chroma_qp_offset_list_len_minus1 may be in the range of 0 to 5.

In addition, for example, the syntax elements cb_qp_offset_list[i], cr_qp_offset_list[i], and joint_cbcr_qp_offset_list[i] may specify offsets used for deriving $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] may be in the range of −12 to +12. In addition, when pps_joint_cbcr_qp_offset_present_flag is equal to 0, joint_cbcr_qp_offset_list[i] may not be present, and the value of joint_cbcr_qp_offset_list[i] may be inferred to be equal to 0.

In addition, when the value of pps_slice_chroma_qp_offsets_present_flag is equal to 1, additional syntax elements for chroma QP offsets may be signaled in a slice header as follows.

TABLE 2

| | Descriptor |
|---|---|
| slice_header( ) { | |
| ... | |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | sc(v) |
|   } | |
|   if( pps_cu_chroma_qp_offset_list_enabled_flag ) | |
|     cu_chroma_qp_offset_enabled_flag | u(1) |
| ... | |
| } | |

Semantics for syntax elements shown in Table 2 above may be as follows.

For example, slice_cb_qp_offset may specify a difference to be added to the value of pps_cb_qp_offset when determining the value of the quantization parameter $Qp'_{Cb}$. The value of slice_cb_qp_offset may be in the range of −12 to +12. In addition, for example, when slice_cb_qp_offset is not present, the slice_cb_qp_offset may be inferred to be equal to 0. The value of pps_cb_qp_offset+slice_cb_qp_offset may be in the range of −12 to +12.

In addition, for example, slice_cr_qp_offset may specify a difference to be added to the value of pps_cr_qp_offset when determining the value of the quantization parameter $Qp'_{Cr}$. The value of slice_cr_qp_offset may be in the range of −12 to +12. In addition, for example, when slice_cr_qp_offset is not present, the slice_cr_qp_offset may be inferred to be equal to 0. The value of pps_cr_qp_offset+slice_cr_qp_offset may be in the range of −12 to +12.

In addition, for example, slice_cbcr_qp_offset may specify a difference to be added to the value of pps_cbcr_qp_offset when determining the value of the quantization parameter $Qp'_{CbCr}$. The value of slice_cbcr_qp_offset may be in the range of −12 to +12. In addition, for example, when slice_cbcr_qp_offset is not present, the slice_cbcr_qp_offset may be inferred to be equal to 0. The value of pps_cbcr_qp_offset+slice_cbcr_qp_offset may be in the range of −12 to +12.

In addition, for example, cu_chroma_qp_offset_enabled_flag may specify whether cu_chroma_qp_offset_flag may be present in a transform unit syntax and a palette coding syntax. For example, cu_chroma_qp_offset_enabled_flag equal to 1 may specify that the cu_chroma_qp_offset_flag may be present in the transform unit syntax and the palette coding syntax. In addition, for example, cu_chroma_qp_offset_enabled_flag equal to 0 may specify that the cu_chroma_qp_offset_flag is not present in the transform unit or the palette coding syntax. When cu_chroma_qp_offset_enabled_flag is not present, the value of cu_chroma_qp_offset_enabled_flag may be inferred to be equal to 0.

In addition, when the value of cu_chroma_qp_offset_enabled_flag is equal to 1, information for determining the chroma QP offset may be signaled at a CU level (i.e., in a palette syntax table and in a transform unit table) as follows.

TABLE 3

| palette_coding( x0, y0, cbWidth, cbHeight, treeType ) { | Descriptor |
|---|---|
|   ... | |
|   if(treeType != DUAL_TREE_LUMA && palette_escape_val_present_flag) | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag ) | |
|         cu_chroma_qp_offset_idx | ae(v) |
|     } | |
|   ... | |
| } | |

TABLE 4

| transform_unit( x0, y0, tbWidth, tbHeight, treeType, subTuIndex, chType ) { | Descriptor |
|---|---|
|   ... | |
|   if( ( CbWidth[ chType ][ x0 y0 ] > 64 \|\| CbHeight[ chType ][ x0 ][ y0 ] > 64 \|\| | |
|     ( chromaAvailable && ( tu_cbf_cb[ xC ][ yC ] \|\| tu_cbf_cr[ xC ] [ yC ] ) ) ) && | |
|     treeType != DUAL_TREE_LUMA ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
|   } | |
| } | |

Semantics for syntax elements shown in Table 3 and Table 4 may be as follows.

For example, the syntax element cu_chroma_qp_offset_flag may specify whether an entry of cb_qp_offset_list[ ] is used to determine a value of CuQpOffset$_{Cb}$, a corresponding entry of cr_qp_offset_list[ ] is used to determine a value of CuQpOffset$_{Cr}$, and a corresponding entry of joint_cbcr_qp_offset_list[ ] is used to determine a value of CuQpOffset$_{CbCr}$. For example, when cu_chroma_qp_offset_flag is present and cu_chroma_qp_offset_flag is equal to 1, cu_chroma_qp_offset_flag may specify that the entry of cb_qp_offset_list[ ] is used to determine the value of CuQpOffset$_{Cb}$, the corresponding entry of cr_qp_offset_list[ ] is used to determine the value of CuQpOffset$_{Cr}$, and the corresponding entry of joint_cbcr_qp_offset_list[ ] is used to determine the value of CuQpOffset$_{CbCr}$. In addition, for example, when cu_chroma_qp_offset_flag is equal to 0, cu_chroma_qp_offset_flag may specify that cb_qp_offset_list[ ], cr_qp_offset_list[ ], and joint_cbcr_qp_offset_list[ ] are not used to determine values of CuQpOffset$_{Cb}$, CuQpOffset$_{Cr}$, and CuQpOffset$_{CbCr}$.

In addition, for example, when cu_chroma_qp_offset_idx is present, the cu_chroma_qp_offset_idx may specify an index for cb_qp_offset_list[ ], cr_qp_offset_list[ ], and joint_cbcr_qp_offset_list[ ] used to determine values of CuQpOffset$_{Cb}$, CuQpOffset$_{Cr}$, and CuQpOffset$_{CbCr}$.

Thereafter, the variable IsCuChromaQpOffsetCoded and the variables CuQpOffset$_{Cb}$, CuQpOffset$_{Cr}$, and CuQpOffset$_{CbCr}$ may be derived as shown in the table below.

Referring to Table 6, a quantization parameter for a chroma Cb component may be denoted by Qp'$_{Cb}$, a quantization parameter for a chroma Cr component may be denoted by Qp'$_{Cr}$, and a quantization parameter for joint Cb-Cr coding may be denoted by Qp'$_{CbCr}$.

Meanwhile, the aforementioned signaling design for supporting chroma QP offsets may not be optimal for signalling of information on a chroma QP offset list of a PPS. For example, in the PPS, the syntax elements pps_cb_qp_offset, pps_cr_qp_offset, and pps_joint_cbcr_qp_offset may be signaled irrespective of a list of cb_qp_offset_list[ ], cr_qp_offset_list[ ], and joint_cbcr_qp_offset_list[ ]. However, when the value of pps_cb_qp_offset is used to derive the value of Qp'$_{Cb}$ as shown in Table 6 above, the value of pps_cb_qp_offset may always be present together with CuQpOffset$_{Cb}$. In addition, as shown in Table 6 above, when the value of pps_cr_qp_offset is used to derive the value of Qp'$_{Cr}$ and the value of pps_joint_cbcr_qp_offset is used to derive the value of Qp'$_{CbCr}$, the value of pps_cr_qp_offset and the value of pps_joint_cbcr_qp_offset may always be present together with CuQpOffset$_{Cr}$ and CuQpOffset$_{CbCr}$. Such a design may not be an optimal design since summation (i.e., pps_cb_qp_offset+CuQpOffset$_{Cb}$, pps_cr_qp_offset+CuQpOffset$_{Cr}$ 및 pps_joint_cbcr_qp_offset+CuQpOffset$_{CbCr}$) shall be performed in all coding units (CUs). For example, the aforementioned case may be avoided when pps_cb_qp_offset and cb_qp_offset_list[ ], pps_cr_qp_offset and cr_qp_offset_list[ ], and pps_joint_cbcr_qp_offset and joint_cbcr_qp_offset_list[ ] are merged to each other. That is, when CuQpOffset$_{Cb}$ derived based on cb_qp_offset_list[ ] is derived in the same manner as pps_cb_qp_offset+CuQpOffset$_{Cb}$ previously derived, CuQpOffset$_{Cr}$ derived

TABLE 5

- The variable IsCuChromaQpOffsetCoded is set equal to 1.
- The variables CuQpOffset$_{Cb}$, CuQpOffset$_{Cr}$, and CuQpOffset$_{CbCr}$ are derived as follows:
    - If cu_chroma_qp_offset_flag is equal to 1, the following applies:
        CuQpOffset$_{Cb}$ = cb_qp_offset_list[ cu_chroma_qp_offset_idx ]   (7-151)
        CuQpOffset$_{Cr}$ = cr_qp_offset_list[ cu_chroma_qp_offset_idx ]   (7-152)
        CuQpOffset$_{CbCr}$ =
        joint_cbcr_qp_offset_list[ cu_chroma_qp_offset_idx ]   (7-153)
    - Otherwise (cu_chroma_qp_offset_flag is equal to 0), CuQpOffset$_{Cb}$, CuQpOffset$_{Cr}$, and CuQpOffset$_{CbCr}$ are all set equal to 0.

The variables CuQpOffset$_{Cb}$, CuQpOffset$_{Cr}$, and CuQpOffset$_{CbCr}$ may be used in a derivation process (an array construction process) for quantization parameters as shown in the table below.

TABLE 6

Derivation process for quantization parameters
...
When ChromaArrayType is not equal to 0 and treeType is equal to SINGLE_TREE or DUAL_TREE_CHROMA, the following applies:
- When treeType is equal to DUAL_TREE_CHROMA, the variable Qp$_Y$ is set equal to the luma quantization parameter Qp$_Y$ of the luma coding unit that covers the luma location ( xCb + cbWidth / 2, yCb + cbHeight / 2 ).
- The variables qP$_{Cb}$, qP$_{Cr}$ and qP$_{CbCr}$ are derived as follows:
    qPi$_{Chroma}$ = Clip3( −QpBdOffset, 63, Qp$_Y$ )   (8-925)
    qPi$_{Cb}$ = ChromaQpTable[ 0 ][ qPi$_{Chroma}$ ]   (8-926)
    qPi$_{Cr}$ = ChromaQpTable[ 1 ][ qPi$_{Chroma}$ ]   (8-927)
    qPi$_{CbCr}$ = ChromaQpTable[ 2 ][ qPi$_{Chroma}$ ]   (8-928)
- The chroma quantization parameters for the Cb and Cr components, Qp'$_{Cb}$ and Qp'$_{Cr}$, and joint Cb-Cr coding Qp'$_{CbCr}$ are derived as follows:
    Qp'$_{Cb}$ = Clip3( −QpBdOffset, 63, qP$_{Cb}$ + pps_cb_qp_offset + slice_cb_qp_offset + Cu QpOffset$_{Cb}$) + QpBdOffset   (8-929)
    Qp'$_{Cr}$ = Clip3( −QpBdOffset, 63, qP$_{Cr}$ + pps_cr_qp_offset + slice_cr_qp_offset + CuQ pOffsetc ) + QpBdOffset   (8-930)
    Qp'$_{CbCr}$ = Clip3( −QpBdOffset, 63, qP$_{cbCr}$ + pps_joint_cbcr_qp_offset + slice_joint_cb cr_qp_offsct +CuQpOffsct$_{CbCr}$) + QpBdOffset   (8-931)
...

based on cr_qp_offset_list[ ] is derived in the same manner as pps_cr_qp_offset+CuQpOffset$_{Cr}$ derived previously, and CuQpOffset$_{CbCr}$ derived based on joint_cbcr_qp_offset_list[ ] is derived in the same manner as in pps_joint_cbcr_qp_offset+CuQpOffset$_{Cb}$ derived previously, signaling of the syntax elements pps_cb_qp_offset, pps_cr_qp_offset, and pps_joint_cbcr_qp_offset may not be necessary in the PPS, thereby further improving coding efficiency.

Accordingly, the present document proposes a solution to the aforementioned problem. Proposed embodiments may be applied individually or in combination.

As an embodiment, the present document proposes a method of signaling a syntax element of a parameter set indicating the number of chroma QP offset lists without conditions. That is, the syntax element of the parameter set indicating the number of chroma QP offset lists without conditions may be signaled in the present embodiment, unlike in the existing PPS as shown in Table 1 in which the syntax element of the parameter set indicating the number of chroma QP offset lists is signaled only when the value of pps_cu_chroma_qp_offset_list_enabled_flag is equal to 1. Herein, the chroma QP offset list may include a chroma QP offset list for a chroma Cb component (e.g., a Cb QP offset list) and a chroma QP offset list for a chroma Cr component (e.g., a Cr QP offset list). In addition, when joint CbCr coding is enable, the chroma QP offset list may further include a chroma QP offset list for the joint CbCr coding (e.g., a CbCr QP offset list).

Meanwhile, in the present embodiment, when a bitstream is a monochrome bitstream or when color components are coded separately, the number of chroma QP offsets signaled in the parameter set may be equal to 0. That is, for example, when the bitstream is the monochrome bitstream or when the color components are coded separately, a value of a syntax element indicating the number of chroma QP offsets to be signaled may be set equal to 0. Otherwise, the value of the syntax element may be set equal to a value greater than 0.

Alternatively, for example, a method of constraining the number of chroma QP offset lists to be greater than 0 may be proposed. For example, a method in which the syntax element indicating the number of chroma QP offset lists is signaled with_minus1 may be proposed. When the bitstream is the monochrome bitstream or when the color components are coded separately, the syntax element may specify that values of the chroma QP offsets are not used and are ignored.

In addition, in a method proposed in the present embodiment, the syntax elements pps_cb_qp_offset and cb_qp_offset_list[ ] are merged as one integrated list, pps_cr_qp_offset and cr_qp_offset_list[ ] are merged as one integrated list, and pps_joint_cbcr_qp_offset and joint_cbcr_qp_offset_list[ ] are merged as one integrated list. For example, the integrated lists may be represented by pps_cb_qp_offset_list [ ], pps_cr_qp_offset_list[ ], and pps_joint_cbcr_qp_offset_list[ ]. In this case, pps_cb_qp_offset_list[0], pps_cr_qp_offset_list[0], and pps_joint_cbcr_qp_offset_list[0] may have values equal to the previous values of pps_cb_qp_offset, pps_cr_qp_offset, and pps_joint_cbcr_qp_offset, respectively. That is, the present embodiment may propose a solution to a problem in that pps_cb_qp_offset, pps_cr_qp_offset, and pps_joint_cbcr_qp_offset are not signaled in the PPS. Herein, pps_joint_cbcr_qp_offset may also be called pps_joint_cbcr_qp_offset_value. In addition, pps_cb_qp_offset_list[1], pps_cr_qp_offset_list[1], and pps_joint_cbcr_qp_offset_list[1] may have values equal to the previous values of pps_cb_qp_offset+cb_qp_offset_list[0], pps_cr_qp_offset+cr_qp_offset_list[0], and pps_joint_cbcr_qp_offset+joint_cbcr_qp_offset_list[0], respectively. In addition, pps_cb_qp_offset_list[n], pps_cr_qp_offset_list[n], and pps_joint_cbcr_qp_offset_list[n] may have values equal to the previous values of pps_cb_qp_offset+cb_qp_offset_list[n−1], pps_cr_qp_offset+cr_qp_offset_list[n−1], and pps_joint_cbcr_qp_offset+joint_cbcr_qp_offset_list[n−1], respectively.

In addition, the present embodiment proposes a method of changing the process of deriving the chroma quantization parameter Qp'$_{Cb}$ for the Cb component, the chroma quantization parameter Qp'$_{Cr}$ for the Cr component, and the chroma quantization parameter Qp'$_{CbCr}$ for the joint CbCr coding. Specifically, unlike in the conventional process, Qp'$_{Cb}$ may be derived without summation of pps_cb_qp_offset and CuQpOffset$_{Cb}$, Qp'$_{Cr}$ may be derived without summation of pps_cr_qp_offset and CuQpOffset$_{Cr}$, and Qp'$_{CbCr}$ may be derived without summation of pps_joint_cbcr_qp_offset and CuQpOffset$_{CbCr}$.

For example, the syntax of the PPS proposed in the present embodiment may be as shown in the table below.

TABLE 7

| pic_parameter_set_rbsp( ) { | Descriptor |
|---|---|
| ... | |
|   pps_joint_cbcr_qp_offset_present_flag | u(1) |
|   pps_chroma_qp_offset_list_len_minus1 | ue(v) |
|   for( i = 0; i <= pps_chroma_qp_offset_list_len_minus1; i++ ) { | |
|     pps_cb_qp_offset_list[ i ] | se(v) |
|     pps_cr_qp_offset_list[ i ] | se(v) |
|     if( pps_joint_cbcr_qp_offset_present_flag ) | |
|       pps_joint_cbcr_qp_offset_list[ i ] | se(v) |
|   } | |
|   pps_slice_chroma_qp_offsets_present_flag | u(1) |
|   ... | |
| } | |

For example, referring to Table 7, the syntax elements pps_joint_cbcr_qp_offset_present_flag, pps_chroma_qp_offset_list_len_minus1, and pps_cb_qp_offset_list[i], pps_cr_qp_offset_list[i] may be signaled through a PPS. In addition, for example, referring to Table 7, when pps_joint_cbcr_qp_offset_present_flag is equal to 1, the syntax element pps_joint_cbcr_qp_offset_list[i] may be further signaled through the PPS. In addition, referring to Table 7, the syntax element pps_slice_chroma_qp_offsets_present_flag may be signaled through the PPS.

In addition, according to the present embodiment, unlike in the existing PPS shown in the Table 1 above, the syntax elements pps_cb_qp_offset, pps_cr_qp_offset and pps_joint_cbcr_qp_offset_value may not be signaled in the PPS. In addition, according to the present embodiment, unlike in the existing PPS shown in the Table 1 above, pps_cu_chroma_qp_offset_list_enabled_flag may not be signaled in the PPS.

Semantics for syntax elements shown in Table 7 may be as follows.

For example, the syntax element pps_joint_cbcr_qp_offset_present_flag may specify whether pps_joint_cbcr_qp_offset_list[i] is present in the PPS RBSP syntax structure. For example, pps_joint_cbcr_qp_offset_present_flag equal to 1 may specify that pps_joint_cbcr_qp_offset_list[i] is present in the PPS RBSP syntax structure. In addition, for example, pps_joint_cbcr_qp_offset_present_flag equal to 0 may specify that pps_joint_cbcr_qp_offset_list[i] is not present in the PPS RBSP syntax structure. In addition, when ChromaArrayType is equal to 0 or sps_joint_cbcr_enabled_flag is equal to 0, the value of pps_joint_cbcr_qp_offset_present_flag may be equal to 0.

In addition, for example, the syntax element pps_chroma_qp_offset_list_len_minus1 plus 1 may specify the number of syntax elements pps_cb_qp_offset_list[i], pps_cr_qp_offset_list[i], and pps_joint_cbcr_qp_offset_list[i] which are present in the PPS RBSP syntax structure. The value of chroma_qp_offset_list_len_minus1 may be in the range of 0 to 6. In addition, when ChromaArrayType is equal to 0, the value of pps_chroma_qp_offset_list_len_minus1 may be equal to 0.

In addition, for example, the syntax element pps_cb_qp_offset_list[i], pps_cr_qp_offset_list[i], and pps_joint_cbcr_qp_offset_list[i] may specify offsets used for deriving $Qp'_{Cb}$, $Qp'_{Cr}$, $Qp'_{CbCr}$, respectively. The values of pps_cb_qp_offset_list[i], pps_cr_qp_offset_list[i], and pps_joint_cbcr_qp_offset_list[i] may be in the range of −12 to +12. In addition, when ChromaArrayType is equal to 0, pps_cb_qp_offset_list[i], pps_cr_qp_offset_list[i], and pps_joint_cbcr_qp_offset_list[i] may not be used in the decoding process, and a decoder may ignore values of the syntax elements.

In addition, for example, the syntax element pps_slice_chroma_qp_offsets_present_flag may specify whether the syntax elements slice_cb_qp_offset and slice_cr_qp_offset are present in the associated slice headers. For example, pps_slice_chroma_qp_offsets_present_flag equal to 1 may specify that slice_cb_qp_offset and slice_cr_qp_offset are present in the associated slice headers. In addition, for example, pps_slice_chroma_qp_offsets_present_flag equal to 0 may specify that slice_cb_qp_offset and slice_cr_qp_offset are not present in the associated slice headers. In addition, when ChromaArrayType is equal to 0, pps_slice_chroma_qp_offsets_present_flag may be equal to 0.

In addition, the present embodiment proposes a syntax of a picture header (PH) as follows.

TABLE 8

| picture header rbsp( ) { | Descriptor |
|---|---|
| ... | |
|   if(pps_chroma_qp_offset_list_len_minus 1) { | |
|     pic_cu_chroma_qp_offset_subdiv_intra_slice | |
|     pic_cu_chroma_qp_offset_subdiv_inter_slice | |
|   } | |
| ... | |
| } | |

For example, referring to Table 8, pic_cu_chroma_qp_offset_subdiv_intra_slice and pic_cu_chroma_qp_offset_subdiv_inter_slice may be signaled based on pps_chroma_qp_offset_list_len_minus1. For example, when the value of pps_chroma_qp_offset_list_len_minus1 is not equal to 0, pic_cu_chroma_qp_offset_subdiv_intra_slice and pic_cu_chroma_qp_offset_subdiv_inter_slice may be signaled in the PH, and when the value of pps_chroma_qp_offset_list_len_minus1 is equal to 0, pic_cu_chroma_qp_offset_subdiv_intra_slice and pic_cu_chroma_qp_offset_subdiv_inter_slice may not be signaled.

According to the present embodiment, pic_cu_chroma_qp_offset_subdiv_intra_slice and pic_cu_chroma_qp_offset_subdiv_inter_slice may be signaled based on pps_chroma_qp_offset_list_len_minus1, unlike in the existing syntax structure in which pic_cu_chroma_qp_offset_subdiv_intra_slice and pic_cu_chroma_qp_offset_subdiv_inter_slice are signaled based on pps_cu_chroma_qp_offset_list_enabled_flag.

For example, the syntax element pic_cu_chroma_qp_offset_subdiv_intra_slice may specify the maximum cbSubdiv value of a coding unit in an intra-slice which transfers cu_chroma_qp_offset_flag. The value of pic_cu_chroma_qp_offset_subdiv_intra_slice may be in the range of 0 to 2*(CtbLog2SizeY−MinQtLog2SizeIntraY+ph_max_mtt_hierarchy_depth_intra_slice_luma).

For example, the syntax element pic_cu_chroma_qp_offset_subdiv_inter_slice may specify the maximum cbSubdiv value of a coding unit in an inter-slice which transfers cu_chroma_qp_offset_flag. The value of pic_cu_chroma_qp_offset_subdiv_inter_slice may be in the range of 0 to 2*(CtbLog2SizeY−MinQtLog2SizeInterY+ph_max_mtt_hierarchy_depth_inter_slice).

In addition, the present embodiment proposes a syntax of a slice header (SH) as follows.

TABLE 9

| slice_header( ) { | Descriptor |
|---|---|
| ... | |
|   if( pps_chroma_qp_offset_list_len_minus 1) | |
|     cu_chroma_qp_offset_enabled_flag | u(1) |
| ... | |
| } | |

For example, referring to Table 9, cu_chroma_qp_offset_enabled_flag may be signaled based on pps_chroma_qp_offset_list_len_minus1. For example, when the value of pps_chroma_qp_offset_list_len_minus1 is not equal to 0, cu_chroma_qp_offset_enabled_flag may be signaled in an SH, and when the value of pps_chroma_qp_offset_list_len_minus1 is equal to 0, cu_chroma_qp_offset_enabled_flag may not be signaled.

According to the present embodiment, cu_chroma_qp_offset_enabled_flag may be signaled based on pps_chroma_qp_offset_list_len_minus1, unlike in the existing syntax structure in which cu_chroma_qp_offset_enabled_flag is signaled based on pps_cu_chroma_qp_offset_list_enabled_flag.

For example, the syntax element cu_chroma_qp_offset_enabled_flag may specify whether cu_chroma_qp_offset_flag may be present in a transform unit syntax and palette coding syntax of a current slice. For example, cu_chroma_qp_offset_enabled_flag equal to 1 may specify that cu_chroma_qp_offset_flag is present in the transform unit syntax and palette coding syntax of the current slice, and cu_chroma_qp_offset_enabled_flag equal to 0 may specify that cu_chroma_qp_offset_flag is not present in the transform unit syntax and palette coding syntax of the current slice. Meanwhile, when cu_chroma_qp_offset_enabled_flag is not present, the value of cu_chroma_qp_offset_enabled_flag may be inferred to be equal to 0.

In addition, the present embodiment proposes a palette coding syntax and a transform unit syntax as described below.

TABLE 10

| palette_coding( x0, y0, cbWidth, cbHeight, treeType ) { | Descriptor |
|---|---|
| ... | |
|   if( treeType != DUAL_TREE_LUMA && palette_escape_val_present_flag ) | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && pps_chroma_qp_offset_list_len_minus1 > 1 ) | |
|         cu_chroma_qp_offset_idx | ae(v) |
|     } | |
| ... | |
| } | |

TABLE 11

| transform_unit( x0, y0, tbWidth, tbHeight, treeType, subTuIndex, chType ) { | Descriptor |
|---|---|
| ... | |
|   if( ( CbWidth[ chType ][ x0 ][ y0 ] > 64 | | CbHeight[ chType ][ x0 ][ y0 ] > 64 | | | |
|     ( chromaAvailable && (tu_cbf_cb[ xC ][ yC ] | | tu_cbf_cr[ xC ][ yC ] ) ) ) && | |
|     treeType != DUAL_TREE_LUMA ) { | |
|     if( cu_chroma_qp_offset_enabled flag && !IsCuChromaQpOffsetCoded ) { | |
|       cu_chroma_qp_offset_flag | ae(v) |
|       if( cu_chroma_qp_offset_flag && pps_chroma_qp_offset_list_len_minus1 > 1 ) | |
|         cu_chroma_qp_offset_idx | ae(v) |
|     } | |
|   } | |
| ... | |
| } | |

For example, referring to Table 10, cu_chroma_qp_offset_idx may be signaled based on cu_chroma_qp_offset_flag and pps_chroma_qp_offset_list_len_minus1. For example, when the value of cu_chroma_qp_offset_flag is equal to 1 and the value of pps_chroma_qp_offset_list_len_minus1 is greater than 1, cu_chroma_qp_offset_idx may be signaled in the palette coding syntax, and when the value of cu_chroma_qp_offset_flag is not equal to 1 or the value of pps_chroma_qp_offset_list_len_minus1 is not greater than 1, cu_chroma_qp_offset_idx may not be signaled in the palette coding syntax.

In addition, for example, referring to Table 11, cu_chroma_qp_offset_idx may be signaled based on cu_chroma_qp_offset_flag and pps_chroma_qp_offset_list_len_minus1. For example, when the value of cu_chroma_qp_offset_flag is equal to 1 and the value of pps_chroma_qp_offset_list_len_minus1 is greater than 1, cu_chroma_qp_offset_idx may be signaled in the transform unit syntax, and when the value of cu_chroma_qp_offset_flag is not equal to 1 or the value of pps_chroma_qp_offset_list_len_minus1 is not greater than 1, cu_chroma_qp_offset_idx may not be signaled in the transform unit syntax.

Meanwhile, for example, the syntax element cu_chroma_qp_offset_flag shown in Table 10 and Table 11 may specify whether an index for deriving values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is greater than 0. For example, cu_chroma_qp_offset_flag equal to 1 may specify that the index for deriving the values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is greater than 0. In addition, for example, cu_chroma_qp_offset_flag equal to 0 may specify that the index for deriving the values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is equal to 0.

In addition, for example, when the value of cu_chroma_qp_offset_flag is equal to 1, the syntax element cu_chroma_qp_offset_idx shown in Table 10 and Table 11 may be used to derive an index for pps_cb_qp_offset_list[ ], cr_qp_offset_list[ ], and joint_cbcr_qp_offset_list[ ] used to determine respective values of $CuQpOffset_{Cb}$, $CuQpOffset_{Cr}$, and $CuQpOffset_{CbCr}$. When cu_chroma_qp_offset_idx is not present, the value of cu_chroma_qp_offset_idx may be inferred to be equal to 0.

For example, the values of $CuQpOffset_{Cb}$, $CuQpOffset_{Cr}$, and $CuQpOffset_{CbCr}$ may be derived as follows.

For example, when cu_chroma_qp_offset_flag is present, the variable IsCuChromaQpOffsetCoded may be set equal to 1 Thereafter, $CuQpOffset_{Cb}$, $CuQpOffset_{Cr}$, and $CuQpOffset_{CbCr}$ may be derived as shown in the equation below.

$$CuQpOffset_{cb} = pps\_cb\_qp\_offset\_list[!cu\_chroma\_qp\_offset\_flag?0:cu\_chroma\_qp\_offset\_idx+1]$$

$$CuQpOffset_{cr} = pps\_cr\_qp\_offset\_list[!cu\_chroma\_qp\_offset\_flag?0:cu\_chroma\_qp\_offset\_idx+1]$$

CuQpOffset$_{CbCr}$=pps_joint_cbcr_qp_offset_list
[!cu_chroma_qp_offset_flag?0:cu_chroma_qp_offset_idx+1]   [Equation 1]

Referring to Equation 1, when the value of cu_chroma_qp_offset_flag is equal to 0, CuQpOffset$_{Cb}$ may be derived as pps_cb_qp_offset_list[0], and when the value of cu_chroma_qp_offset_flag is equal to 1, CuQpOffset$_{Cb}$ may be derived as pps_cb_qp_offset_list[cu_chroma_qp_offset_idx+1]. Herein, pps_cb_qp_offset_list[i] may specify a value corresponding to an index i in pps_cb_qp_offset_list. In addition, referring to Equation 1, when the value of cu_chroma_qp_offset_flag is equal to 0, CuQpOffset$_{Cr}$ may be derived as pps_cr_qp_offset_list[0], and when the value of cu_chroma_qp_offset_flag is equal to 1, CuQpOffset$_{Cr}$ may be derived as pps_cr_qp_offset_list[cu_chroma_qp_offset_idx+1]. Herein, pps_cr_qp_offset_list[i] may specify a value corresponding to an index i in pps_cr_qp_offset_list. In addition, referring to Equation 1, when the value of cu_chroma_qp_offset_flag is equal to 0, CuQpOffset$_{CbCr}$ may be derived as pps_joint_cbcr_qp_offset_list[0], and when the value of cu_chroma_qp_offset_flag is equal to 1, CuQpOffset$_{CbCr}$ may be derived as pps_joint_cbcr_qp_offset_list[cu_chroma_qp_offset_idx+1]. Herein, pps_joint_cbcr_qp_offset_list[i] may specify a value corresponding to an index i in pps_joint_cbcr_qp_offset_list.

Meanwhile, referring to Equation 1 proposed in the present embodiment, when the value of cu_chroma_qp_offset_flag is equal to 0, CuQpOffset$_{Cb}$, CuQpOffset$_{Cr}$, and CuQpOffset$_{CbCr}$ may be derived as pps_cb_qp_offset_list[0], pps_cr_qp_offset_list[0], and pps_joint_cbcr_qp_offset_list[0], unlike in the existing case where CuQpOffset$_{Cb}$, CuQpOffset$_{Cr}$, and CuQpOffset$_{CbCr}$ are set equal to 0. That is, the present embodiment may propose a solution to a problem in that pps_cb_qp_offset, pps_cr_qp_offset, and pps_joint_cbcr_qp_offset_value are not signaled in the PPS.

In addition, the present embodiment proposes a method of deriving chroma quantization parameters Qp'$_{Cb}$, Qp'$_{Cr}$, and Qp'$_{CbCr}$ as follows.

In addition, as an embodiment, the present document proposes a method of signaling a syntax element of a parameter set indicating the number of chroma QP offset lists without conditions. That is, the syntax element of the parameter set indicating the number of chroma QP offset lists without conditions may be signaled in the present embodiment, unlike in the existing PPS as shown in Table 1 in which the syntax element of the parameter set indicating the number of chroma QP offset lists is signaled only when the value of pps_cu_chroma_qp_offset_list_enabled_flag is equal to 1. Herein, the chroma QP offset list may include a chroma QP offset list for a chroma Cb component (e.g., a Cb QP offset list) and a chroma QP offset list for a chroma Cr component (e.g., a Cr QP offset list). In addition, when joint CbCr coding is enable, the chroma QP offset list may further include a chroma QP offset list for the joint CbCr coding (e.g., a CbCr QP offset list).

In addition, the present document proposes an embodiment in which information on a chroma QP offset set is signaled, but even a minimum chroma CP offset set may not be signaled. That is, for example, a method in which_minus1 is not used in a syntax element_minus1 indicating the number of chroma QP offset lists may be proposed.

For example, a syntax of a PPS proposed in the present embodiment may be as shown in the table below.

TABLE 13

| pic_parameter_set_rbsp( ) { | Descriptor |
|---|---|
| ... | |
| pps_joint_cbcr_qp_offset_present_flag | u(1) |
| pps_chroma_qp_offset_list_len | ue(v) |
| for( i = 0; i < pps_chroma_qp_offset_list_len; i++ ) { | |
|     pps_cb_qp_offset_list[ i ] | se(v) |
|     pps_cr_qp_offset_list[ i ] | se(v) |
|     if( pps_joint_cbcr_qp_offset_present_flag ) | |
|         pps_joint_cbcr_qp_offset_list[ i ] | se(v) |
| } | |
| ... | |
| } | |

TABLE 12

Modify derivation of Qp'$_{Cb}$ and Qp'$_{Cr}$, and Qp'$_{CbCr}$ shown below:
...
When ChromaArrayType is not equal to 0 and treeType is equal to SINGLE_TREE or DUAL_TREE_CHROMA, the following applies:
- When treeType is equal to DUAL_TREE_CHROMA, the variable Qp$_Y$ is set equal to the luma quantization parameter Qp$_Y$ of the luma coding unit that covers the luma location ( xCb + cbWidth / 2, yCb + cbHeight / 2 ).
- The variables qP$_{Cb}$, qP$_{Cr}$ and qP$_{CbCr}$ are derived as follows:

qPi$_{Chroma}$ = Clip3( -QpBdOffset, 63, Qp$_Y$ )   (8-925)
    qPi$_{Cb}$ = ChromaQpTable[ 0 ][ qPi$_{Chroma}$ ]   (8-926)
    qPi$_{Cr}$ = ChromaQpTable[ 1 ][ qPi$_{Chroma}$ ]   (8-927)
    qPi$_{CbCr}$ = ChromaQpTable[ 2 ][ qPi$_{Chroma}$ ]   (8-928)

- The chroma quantization parameters for the Cb and Cr components, Qp'$_{Cb}$ and Qp'$_{Cr}$, and joint Cb-Cr coding Qp'$_{CbCr}$ are derived as follows:

Qp'$_{Cb}$ = Clip3( -QpBdOffset, 63, qP$_{Cb}$ + slice_cb_qp_offset + CuQpOffset$_{Cb}$ )
        + QpBdOffset   (8-929)
    Qp'$_{Cr}$ = Clip3( -QpBdOffset, 63, qP$_{Cr}$ + slice_cr_qp_offset + CuQpOffset$_{Cr}$ )
        + QpBdOffset   (8-930)
    Qp'$_{CbCr}$ = Clip3( -QpBdOffset, 63, qP$_{CbCr}$ + slice_joint_cbcr_qp_offset) +QpBdOffset For example, referring to Table 12, Qp'$_{Cb}$ may be derived based on qP$_{Cb}$, slice_cb_qp_offset and CuQpOffset$_{Cb}$, Qp'$_{Cr}$ may be derived based on qP$_{Cr}$, slice_cr_qp_offset and CuQpOffset$_{Cr}$, and Qp'$_{CbCr}$ may be derived based on qP$_{CbCr}$, slice_joint_cbcr_qp_offset, and CuQpOffset$_{CbCr}$. Unlike the existing syntax structure, Qp'$_{Cb}$, Qp'$_{Cr}$, and Qp'$_{CbCr}$ may be derived without pps_cb_qp_offset, pps_cr_qp_offset and pps_joint_cbcr_qp_offset_value.

For example, referring to Table 13, the syntax elements pps_joint_cbcr_qp_offset_present_flag, pps_chroma_qp_offset_list_len, pps_cb_qp_offset_list[i], and pps_cr_qp_offset_list[i] may be signaled through a PPS. In addition, for example, referring to FIG. 13, when pps_joint_cbcr_qp_offset_present_flag is equal to 1, the syntax element pps_joint_cbcr_qp_offset_list[i] may be further signaled through the PPS. In addition, referring to Table 13, the syntax element pps_slice_chroma_qp_offsets_present_flag may be signaled through the PPS.

In addition, according to the present embodiment, unlike in the existing PPS shown in the Table 1 above, the syntax elements pps_cb_qp_offset, pps_cr_qp_offset and pps_joint_cbcr_qp_offset_value may not be signaled in the PPS. In addition, according to the present embodiment, unlike in the existing PPS shown in the Table 1 above, pps_cu_chroma_qp_offset_list_enabled_flag may not be signaled in the PPS.

Semantics for syntax elements shown in Table 13 may be as follows.

For example, the syntax element pps_joint_cbcr_qp_offset_present_flag may specify whether pps_joint_cbcr_qp_offset_list[i] is present in the PPS RBSP syntax structure. For example, pps_joint_cbcr_qp_offset_present_flag equal to 1 may specify that pps_joint_cbcr_qp_offset_list[i] is present in the PPS RBSP syntax structure. In addition, for example, pps_joint_cbcr_qp_offset_present_flag equal to 0 may specify that pps_joint_cbcr_qp_offset_list[i] is not present in the PPS RBSP syntax structure. In addition, when ChromaArrayType is equal to 0 or sps_joint_cbcr_enabled_flag is equal to 0, the value of pps_joint_cbcr_qp_offset_present_flag may be equal to 0.

In addition, for example, the syntax element pps_chroma_qp_offset_list_len may specify the number of syntax elements pps_cb_qp_offset_list[i], pps_cr_qp_offset_list[i], and pps_joint_cbcr_qp_offset_list[i] which are present in the PPS RBSP syntax structure. The value of chroma_qp_offset_list_len may be in the range of 0 to 7. In addition, when ChromaArrayType is equal to 0, the value of pps_chroma_qp_offset_list_len may be equal to 0. In addition, when ChromaArrayType is not equal to 0, the value of pps_chroma_qp_offset_list_len may be greater than 0.

In addition, for example, the syntax element pps_cb_qp_offset_list[i], pps_cr_qp_offset_list[i], and pps_joint_cbcr_qp_offset_list[i] may specify offsets used for deriving $Qp'_{Cb}$, $Qp'_{Cr}$, and Qp'CbCr, respectively. The values of pps_cb_qp_offset_list[1], pps_cr_qp_offset_list[i], and pps_joint_cbcr_qp_offset_list[i] may be in the range of −12 to +12.

In addition, for example, the syntax element pps_slice_chroma_qp_offsets_present_flag may specify whether the syntax elements slice_cb_qp_offset and slice_cr_qp_offset are present in the associated slice headers. For example, pps_slice_chroma_qp_offsets_present_flag equal to 1 may specify that slice_cb_qp_offset and slice_cr_qp_offset are present in the associated slice headers. In addition, for example, pps_slice_chroma_qp_offsets_present_flag equal to 0 may specify that slice_cb_qp_offset and slice_cr_qp_offset are not present in the associated slice headers. In addition, when ChromaArrayType is equal to 0, pps_slice_chroma_qp_offsets_present_flag may be equal to 0.

In addition, the present embodiment proposes a syntax of a picture header (PH) as follows.

TABLE 14

| picture_header_rbsp( ) { | Descriptor |
|---|---|
| ... | |
| if( pps_chroma_qp_offset_list_len > 1 ) { | |
|   pic_cu_chroma_qp_offset_subdiv_intra_slice | ue(v) |
|   pic_cu_chroma_qp_offset_subdiv_inter_slice | ue(v) |
| } | |

For example, referring to Table 14, pic_cu_chroma_qp_offset_subdiv_intra_slice and pic_cu_chroma_qp_offset_subdiv_inter_slice may be signaled based on pps_chroma_qp_offset_list_len. For example, when the value of pps_chroma_qp_offset_list_len is greater than 1, pic_cu_chroma_qp_offset_subdiv_intra_slice and pic_cu_chroma_qp_offset_subdiv_inter_slice may be signaled in the PH, and when the value of pps_chroma_qp_offset_list_len is not greater than 1, pic_cu_chroma_qp_offset_subdiv_intra_slice and pic_cu_chroma_qp_offset_subdiv_inter_slice may not be signaled.

According to the present embodiment, pic_cu_chroma_qp_offset_subdiv_intra_slice and pic_cu_chroma_qp_offset_subdiv_inter_slice may be signaled based on pps_chroma_qp_offset_list_len, unlike in the existing syntax structure in which pic_cu_chroma_qp_offset_subdiv_intra_slice and pic_cu_chroma_qp_offset_subdiv_inter_slice are signaled based on pps_cu_chroma_qp_offset_list_enabled_flag.

For example, the syntax element pic_cu_chroma_qp_offset_subdiv_intra_slice may specify the maximum cbSubdiv value of a coding unit in an intra-slice which transfers cu_chroma_qp_offset_flag. The value of pic_cu_chroma_qp_offset_subdiv_intra_slice may be in the range of 0 to 2*(CtbLog2SizeY−MinQtLog2SizeIntraY+ph_max_mtt_hierarchy_depth_intra_slice_luma).

For example, the syntax element pic_cu_chroma_qp_offset_subdiv_inter_slice may specify the maximum cbSubdiv value of a coding unit in an inter-slice which transfers cu_chroma_qp_offset_flag. The value of pic_cu_chroma_qp_offset_subdiv_inter_slice may be in the range of 0 to 2*(CtbLog2SizeY−MinQtLog2SizeInterY+ph_max_mtt_hierarchy_depth_inter_slice).

In addition, the present embodiment proposes a syntax of a slice header (SH) as follows.

TABLE 15

| slice_header( ) { | Descriptor |
|---|---|
| ... | |
| if( pps_chroma_qp_offset_list_len > 1 ) | |
|   cu_chroma_qp_offset_enabled_flag | u(1) |
| } | |

For example, referring to Table 15, cu_chroma_qp_offset_enabled_flag may be signaled based on pps_chroma_qp_offset_list_len. For example, when the value of pps_chroma_qp_offset_list_len is greater than 1, cu_chroma_qp_offset_enabled_flag may be signaled in an SH, and when the value of pps_chroma_qp_offset_list_len is not greater than 1, cu_chroma_qp_offset_enabled_flag may not be signaled.

According to the present embodiment, cu_chroma_qp_offset_enabled_flag may be signaled based on pps_chroma_qp_offset_list_len, unlike the existing syntax structure in which cu_chroma_qp_offset_enabled_flag is signaled based on pps_cu_chroma_qp_offset_list_enabled_flag.

For example, the syntax element cu_chroma_qp_offset_enabled_flag may specify whether cu_chroma_qp_offset_flag may be present in a transform unit syntax and palette coding syntax of a current slice. For example, cu_chroma_qp_offset_enabled_flag equal to 1 may specify that cu_chroma_qp_offset_flag is present in the transform unit syntax and palette coding syntax of the current slice, and cu_chroma_qp_offset_enabled_flag equal to 0 may specify that cu_chroma_qp_offset_flag is not present in the transform unit syntax and palette coding syntax of the current slice. Meanwhile, when cu_chroma_qp_offset_enabled_flag is not present, the value of cu_chroma_qp_offset_enabled_flag may be inferred to be equal to 0.

In addition, the present embodiment proposes a palette coding syntax and a transform unit syntax as described below.

TABLE 16

| palette_coding( x0, y0, cbWidth, cbHeight, treeType ) { | Descriptor |
|---|---|
| ... | |
| if(treeType != DUAL_TREE_LUMA && palette_escape_val_present_fla g) | |
| if( cu_chroma_qp_offset_enabled_flag && !IsCuChromaQpOffsetCoded ){ | |
| cu_chroma_qp_offset_flag | ae(v) |
| if( cu_chroma_qp_offset_flag && pps_chroma_qp_offset_list_len_minus1 > 2 ) | |
| cu_chroma_qp_offset_idx | ae(v) |
| } | |
| ... | |
| } | |

TABLE 17

| transform_unit( x0, y0, tbWidth, tbHeight, treeType, subTuIndex, chType ) { | Descriptor |
|---|---|
| ... | |
| if ( CbWidthf chType ][ x0 ][ y0 ] > 64 \| \| CbHeight[ chType ][ x0 ][ y 0 ] > 64 \| \| | |
| ( chromaAvailable && (tu_cbf_cb[ xC ][ yC ] \| \| tu_cbf_cr[ xC ][ y C ] ) ) ) && | |
| treeType != DUAL_TREE_LUMA ) { | |
| if( cu_chroma_qp_offset_enabled flag && !IsCuChromaQpOffsetCoded ) { | |
| cu_chroma_qp_offset_flag | ae(v) |
| if( cu_chroma_qp_offset_flag && pps_chroma_qp_offset_list_len_minus1 > 1 ) | |
| cu_chroma_qp_offset_flagidx | ae(v) |
| } | |
| } | |
| ... | |
| } | |

For example, referring to Table 16 cu_chroma_qp_offset_idx may be signaled based on cu_chroma_qp_offset_flag and pps_chroma_qp_offset_list_len. For example, when the value of cu_chroma_qp_offset_flag is equal to 1 and the value of pps_chroma_qp_offset_list_len is greater than 2, cu_chroma_qp_offset_idx may be signaled in the palette coding syntax, and when the value of cu_chroma_qp_offset_flag is not equal to 1 or the value of pps_chroma_qp_offset_list_len is not greater than 2, cu_chroma_qp_offset_idx may not be signaled in the palette coding syntax.

In addition, for example, referring to Table 17, cu_chroma_qp_offset_idx may be signaled based on cu_chroma_qp_offset_flag and pps_chroma_qp_offset_list_len. For example, when the value of cu_chroma_qp_offset_flag is equal to 1 and the value of pps_chroma_qp_offset_list_len is greater than 2, cu_chroma_qp_offset_idx may be signaled in the transform unit syntax, and when the value of cu_chroma_qp_offset_flag is not equal to 1 or the value of pps_chroma_qp_offset_list_len is not greater than 2, cu_chroma_qp_offset_idx may not be signaled in the transform unit syntax.

Meanwhile, for example, the syntax element cu_chroma_qp_offset_flag shown in Table 16 and Table 17 may specify whether an index for deriving values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is greater than 0. For example, cu_chroma_qp_offset_flag equal to 1 may specify that the index for deriving the values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is greater than 0. In addition, for example, cu_chroma_qp_offset_flag equal to 0 may specify that the index for deriving the values of $CuQpOffset_{Cb}$, $CuQpOffset_{Cr}$, and $CuQpOffset_{CbCr}$ in the respective syntax elements pps_cb_qp_offset_list[ ], pps_cr_qp_qp_offset_list[ ], and pps_joint_cbcr_qp_offset_list[ ] is −1.

In addition, for example, when the value of cu_chroma_qp_offset_flag is equal to 1, the syntax element cu_chroma_qp_offset_idx shown in Table 16 and Table 17 may be used to derive an index for pps_cb_qp_offset_list[ ], cr_qp_offset_list[ ], and joint_cbcr_qp_offset_list[ ] used to determine respective values of $CuQpOffset_{Cb}$, $CuQpOffset_{Cr}$, and $CuQpOffset_{CbCr}$. When cu_chroma_qp_offset_idx is not present, the value of cu_chroma_qp_offset_idx may be inferred to be equal to 0.

For example, the values of $CuQpOffset_{Cb}$, $CuQpOffset_{Cr}$, and $CuQpOffset_{CbCr}$ may be derived as follows.

For example, when cu_chroma_qp_offset_flag is present, the variable IsCuChromaQpOffsetCoded may be set equal to 1 Thereafter, $CuQpOffset_{Cb}$, $CuQpOffset_{Cr}$, and $CuQpOffset_{CbCr}$ may be derived as shown in the equation below.

$$CuQpOffset_{cb} = pps\_cb\_qp\_offset\_list[!cu\_chroma\_qp\_offset\_flag?0:cu\_chroma\_qp\_offset\_idx+2]$$

$$CuQpOffset_{cr} = pps\_cr\_qp\_offset\_list[!cu\_chroma\_qp\_offset\_flag?0:cu\_chroma\_qp\_offset\_idx+2]$$

CuQpOffset$_{CbCr}$=pps_joint_cbcr_qp_offset_list
[!cu_chroma_qp_offset_flag?0:cu_chroma_qp_offset_idx+2]       [Equation 2]

Referring to Equation 2, when the value of cu_chroma_qp_offset_flag is equal to 0, CuQpOffset$_{Cb}$ may be derived as pps_cb_qp_offset_list[0], and when the value of cu_chroma_qp_offset_flag is equal to 1, CuQpOffset$_{Cb}$ may be derived as pps_cb_qp_offset_list[cu_chroma_qp_offset_idx+2]. Herein, pps_cb_qp_offset_list[i] may specify a value corresponding to an index i in pps_cb_qp_offset_list. In addition, referring to Equation 2, when the value of cu_chroma_qp_offset_flag is equal to 0, CuQpOffset$_{Cr}$ may be derived as pps_cr_qp_offset_list[0], and when the value of cu_chroma_qp_offset_flag is equal to 1, CuQpOffset$_{Cr}$ may be derived as pps_cr_qp_offset_list[cu_chroma_qp_offset_idx+2]. Herein, pps_cr_qp_offset_list[i] may specify a value corresponding to an index i in pps_cr_qp_offset_list. In addition, referring to Equation 1, when the value of cu_chroma_qp_offset_flag is equal to 0, CuQpOffset$_{CbCr}$ may be derived as pps_joint_cbcr_qp_offset_list[0], and when the value of cu_chroma_qp_offset_flag is equal to 1, CuQpOffset$_{CbCr}$ may be derived as pps_joint_cbcr_qp_offset_list[cu_chroma_qp_offset_idx+2]. Herein, pps_joint_cbcr_qp_offset_list[i] may specify a value corresponding to an index i in pps_joint_cbcr_qp_offset_list.

Meanwhile, referring to Equation 2 proposed in the present embodiment, when the value of cu_chroma_qp_offset_flag is equal to 0, CuQpOffset$_{Cb}$, CuQpOffset$_{Cr}$, and CuQpOffset$_{CbCr}$ may be derived as pps_cb_qp_offset_list[0], pps_cr_qp_offset_list[0], and pps_joint_cbcr_qp_offset_list[0], unlike in the existing case where CuQpOffset$_{Cb}$, CuQpOffset$_{Cr}$, and CuQpOffset$_{CbCr}$ are set equal to 0. That is, the present embodiment may propose a solution to a problem in that pps_cb_qp_offset, pps_cr_qp_offset, and pps_joint_cbcr_qp_offset_value are not signaled in the PPS.

Figure 4:
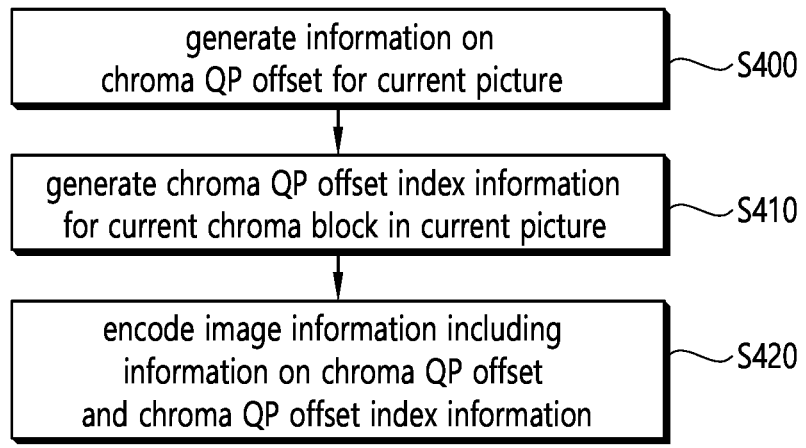
FIG. 4 schematically shows an image encoding method by an encoding apparatus according to the present document.

FIG. 4 schematically shows an image encoding method by an encoding apparatus according to the present document. The method disclosed in FIG. 4 may be performed by the encoding apparatus disclosed in FIG. 2. Specifically, for example, S400 to S420 of FIG. 4 may be performed by an entropy encoder of the encoding apparatus. In addition, although not shown, a process of deriving a prediction sample of a current chroma block may be performed by a predictor of the encoding apparatus, a process of deriving a residual sample of the current chroma block may be performed by a residual processor of the encoding apparatus, and a process of generating a reconstructed sample and reconstructed picture, based on the residual sample and the prediction sample, may be performed by an adder of the encoding apparatus.

The encoding apparatus generates information on a chroma Quantization Parameter (QP) offset for a current picture (S400). The encoding apparatus may generate and encode information on the chroma QP offset for the current picture. Herein, the chroma component may include a chroma Cb component, a chroma Cr component, and/or a joint CbCr component. In addition, the information on the chroma QP offset may include chroma QP offset list length information and/or information on a chroma QP offset list. For example, the information on the chroma QP offset may include the chroma QP offset list length information, and the information on the chroma QP offset list may be generated/encoded/signaled based on the chroma QP offset list length information. In addition, the chroma QP offset list may include a chroma Cb QP offset list, a chroma Cr QP offset list, and/or a chroma CbCr QP offset list.

For example, the encoding apparatus may generate and encode a picture parameter set (PPS) syntax for the current picture. The image information may include the PPS syntax. The image information may be signaled through a bitstream. The PPS syntax may include information on the chroma QP offset list. That is, for example, the encoding apparatus may signal information on the chroma QP offset list through the PPS syntax.

Herein, for example, the chroma QP offset list length information may specify a length of the chroma QP offset list. That is, for example, the chroma QP offset list length information may specify the number of offsets in the chroma QP offset list. For example, the chroma QP offset list length information may specify the number of pieces of information indicating an offset for an index in the chroma QP offset list. A syntax element of the chroma QP offset list length information may be the aforementioned pps_chroma_qp_offset_list_len_minus1 or pps_chroma_qp_offset_list_len.

In addition, for example, the information on the chroma QP offset list may include information indicating an offset for an index in the chroma QP offset list. A syntax element of the information indicating the offset for the index in the chroma QP offset list may be the aforementioned pps_cb_qp_offset_list[i], pps_cr_qp_offset_list[i], and pps_joint_cbcr_qp_offset_list[i].

Meanwhile, for example, the PPS syntax may not include chroma QP offset information. Herein, a chroma CP offset indicated by the chroma QP offset information may be called a PPS level chroma QP offset. That is, for example, the PPS syntax may not include information indicating the PPS level chroma QP offset. A syntax element of the chroma QP offset information may be pps_cb_qp_offset, pps_cr_qp_offset and/or pps_joint_cbcr_qp_offset.

The encoding apparatus generates chroma QP offset index information for a current chroma block in the current picture (S410). The encoding apparatus may generate and encode chroma QP offset index information for the current chroma block in the current picture. The chroma QP offset index information may specify an index used to derive the chroma CP offset of the current chroma block in the chroma QP offset list. In addition, for example, a syntax element of the chroma QP offset index information may be the aforementioned cu_chroma_qp_offset_idx.

For example, the encoding apparatus may generate and encode a transform unit syntax and/or palette coding syntax for the current chroma block. The image information may include the transform unit and/or the palette coding syntax. The transform unit syntax and/or the palette coding syntax may include chroma QP offset index information for the current chroma block. That is, for example, the encoding apparatus may signal the chroma QP offset index information by using the transform unit syntax and/or the palette coding syntax.

In addition, for example, the chroma QP offset index information may be signaled based on the chroma QP offset list length information. For example, when a value of the chroma QP offset list length information is greater than 1, the chroma QP offset index information may be signaled. That is, for example, when the value of the chroma QP offset list length information is greater than 1, the transform unit syntax and/or the palette coding syntax may include the chroma QP offset index information. Alternatively, for example, when the value of the chroma QP offset list length information is greater than 2, the chroma QP offset index information may be signaled. That is, for example, when the value of the chroma QP offset list length information is greater than 2, the transform unit syntax and/or the palette coding syntax may include the chroma QP offset index information.

Meanwhile, for example, a syntax element indicating a maximum cbSubdiv value of a coding unit in an intra slice in a current picture and a syntax element indicating a maximum cbSubdiv value of the intra slice in the current picture may be signaled based on the chroma QP offset list length information. For example, when the value of the chroma QP offset list length information is greater than 0, the syntax elements may be signaled. Alternatively, for example, when the value of the chroma QP offset list length information is greater than 1, the syntax elements may be signaled. The syntax elements may be included in a picture header syntax. Image information may include the picture header syntax.

In addition, for example, a chroma QP offset enable flag may be signaled based on the chroma QP offset list length information. The chroma QP offset enable flag may be included a slice header syntax. Image information may include the slice header syntax. For example, the chroma QP offset enable flag may specify whether a chroma QP offset is enabled for a current chroma block in a current slice. For example, the chroma QP offset enable flag may specify whether a chroma QP offset flag of the current chroma block may be present in a transform unit syntax and/or a palette coding syntax. In addition, the chroma QP offset flag may specify whether an entry in the chroma QP offset list is used to determine a chroma QP offset value. For example, when a value of the chroma QP offset list length information is greater than 0, the chroma QP offset enable flag may be signaled. That is, for example, when the value of the chroma QP offset list length information is greater than 0, the slice header syntax may include a chroma QP offset enable flag. Alternatively, for example, when the chroma QP offset list length information is greater than 1, a chroma QP offset enable flag may be signaled. That is, for example, when the value of the chroma QP list length information is greater than 1, the slice header syntax may include a chroma QP offset enable flag. For example, a syntax element of the chroma QP offset enable flat may be the aforementioned cu_chroma_qp_offset_enabled_flag. In addition, a syntax element of the chroma QP offset flag may be the aforementioned cu_chroma_qp_offset_flag.

The encoding apparatus encodes image information including the information on the chroma QP offset and the chroma QP offset index information (S420). The encoding apparatus may encode the information on the chroma QP offset and the chroma QP offset index information. The image information may include the information on the chroma QP offset and the chroma QP offset index information.

Meanwhile, for example, the encoding apparatus may generate and encode prediction information for the current chroma block. In this case, various prediction methods disclosed in the present document, such as inter prediction, intra prediction, or the like, may be applied. For example, the encoding apparatus may determine whether to perform inter prediction or intra prediction for the current chroma block, and may determine a specific inter prediction mode or a specific intra prediction mode, based on RD cost. The encoding apparatus may derive a prediction sample for the current chroma block, based on the determined mode. The prediction information may include prediction mode information for the current chroma block. The image information may include the prediction information.

In addition, for example, the encoding apparatus may encode residual information for the current chroma block.

For example, the encoding apparatus may derive the residual sample through subtraction of the prediction sample and the original sample for the current chroma block.

Thereafter, for example, the encoding apparatus may derive a quantized residual sample by quantizing the residual sample, based on a chroma QP for the current chroma block, may derive a transform coefficient, based on the quantized residual sample, and may generate and encode the residual information, based on the transform coefficient. Alternatively, for example, the encoding apparatus may derive a quantized residual sample by quantizing the residual sample, based on a chroma QP for the current chroma block, may derive a transform coefficient by transforming the quantized residual sample, and may generate and encode the residual information, based on the transform coefficient.

Herein, the chroma QP for the current chroma block may be derived based on the information on the chroma QP offset and the chroma QP offset index information.

For example, the encoding apparatus may derive the chroma QP offset for the current chroma block, based on the information on the chroma QP offset and the chroma QP offset index information. Herein, the chroma QP offset for the current chroma block may also be called a CU level chroma QP offset. For example, a chroma QP offset of an index indicated by the chroma QP offset index information in the chroma QP offset list may be derived. For example, the chroma QP offset may be derived based on Equation 3 or Equation 4 described below.

Thereafter, the encoding apparatus may derive a chroma QP of the current chroma block, based on the chroma QP offset. For example, the encoding apparatus may derive the chroma QP of the current chroma block, based on a luma QP offset of a luma block for the current chroma block, a slice level chroma QP offset, and/or the chroma QP offset. For example, the chroma QP of the current chroma block may be derived without having to use a PPS level chroma QP offset. Herein, for example, the PPS level chroma QP offset may specify a chroma QP offset indicated by chroma QP offset information included in a PPS syntax. For example, the chroma QP may be derived based on Equation 5 described below.

The image information may include the residual information. In addition, for example, the encoding apparatus may encode the image information and output it in the form of a bitstream.

Meanwhile, for example, the encoding apparatus may generate reconstructed samples and/or a reconstructed picture through summation of the prediction samples and the residual samples.

Thereafter, optionally, an in-loop filtering procedure such as deblocking filtering, SAO, and/or ALF procedures may be applied to the reconstructed picture as described above in order to improve subjective/objective picture quality.

Meanwhile, a bitstream including the image information may be transmitted to a decoding apparatus through a network or a (digital) storage medium. Herein, the network may include a broadcasting network and/or a communication network, and the digital storage medium may include various storage media, such as USB, SD, CD, DVD, Blu-ray, HDD, SSD, and the like.

Figure 5:
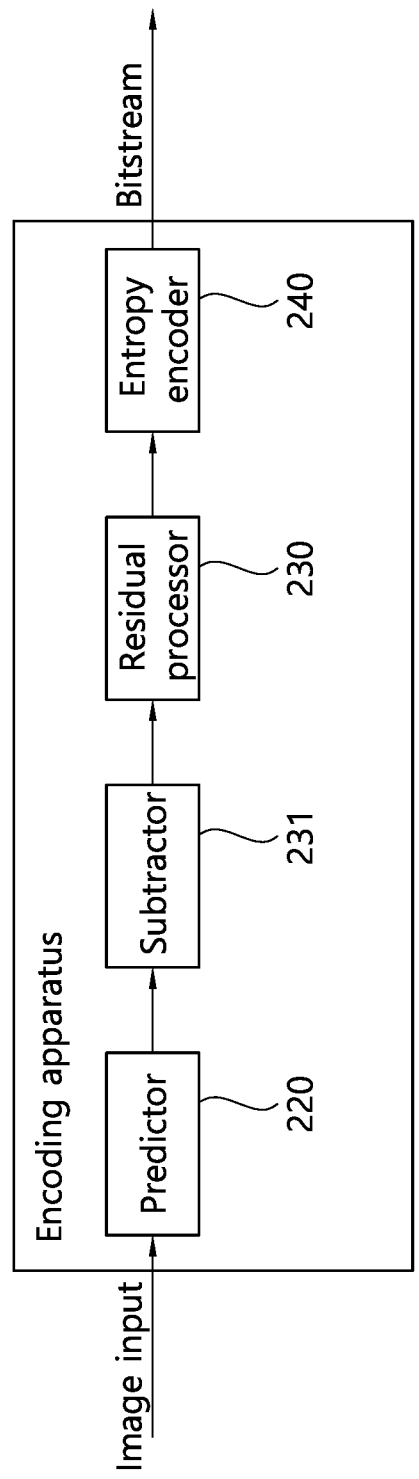
FIG. 5 schematically shows an encoding apparatus for performing an image encoding method according to this document.

FIG. 5 schematically shows an encoding apparatus for performing an image encoding method according to this document. The method disclosed in FIG. 4 may be performed by the encoding apparatus disclosed in FIG. 5.

Specifically, for example, S400 to S420 of FIG. 4 may be performed by an entropy encoder of the encoding apparatus of FIG. 5. In addition, although not shown, a process of deriving a prediction sample of a current chroma block may be performed by a predictor of the encoding apparatus, a process of deriving a residual sample of the current chroma block may be performed by a residual processor of the encoding apparatus, and a process of generating a reconstructed sample and reconstructed picture, based on the residual sample and the prediction sample, may be performed by an adder of the encoding apparatus.

Figure 6:
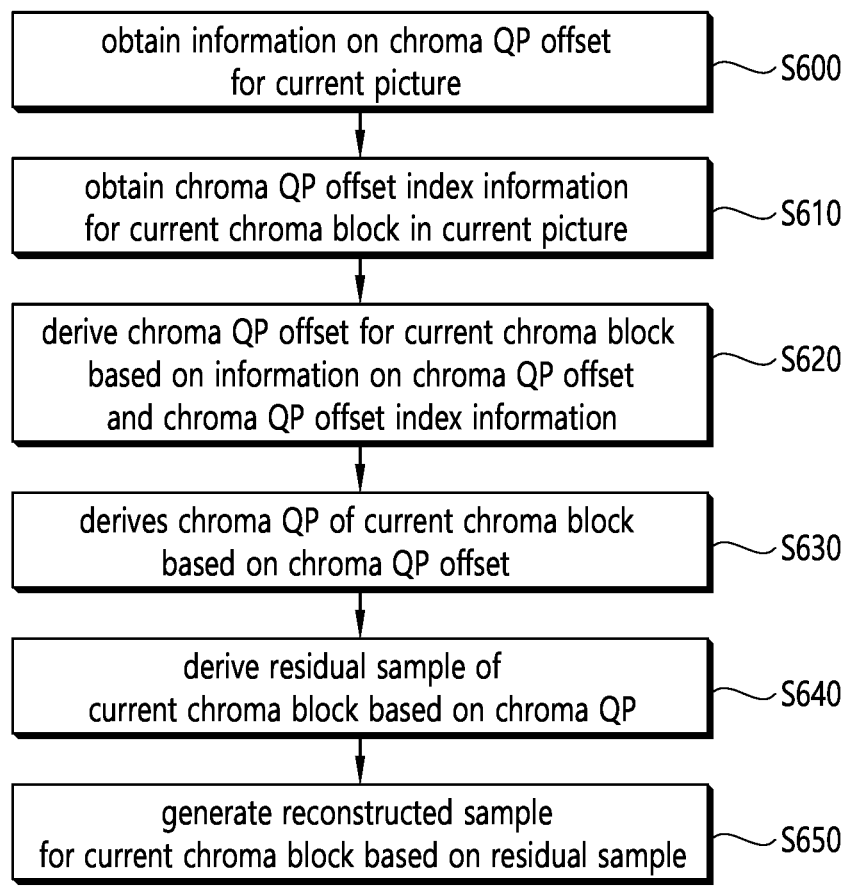
FIG. 6 schematically shows an image decoding method by a decoding apparatus according to this document.

FIG. 6 schematically shows an image decoding method by a decoding apparatus according to this document. The method disclosed in FIG. 6 may be performed by the decoding apparatus disclosed in FIG. 3. Specifically, for example, S600 to S610 of FIG. 6 may be performed by an entropy decoder of the decoding apparatus, S620 to S640 of FIG. 6 may be performed by a residual processor of the decoding apparatus, and S650 of FIG. 6 may be performed by an adder of the decoding apparatus.

The decoding apparatus obtains information on a chroma Quantization Parameter (QP) offset for a current picture (S600). The decoding apparatus may obtain information on the chroma QP offset for the current picture. Herein, the chroma component may include a chroma Cb component, a chroma Cr component, and/or a joint CbCr component. In addition, the information on the chroma QP offset may include chroma QP offset list length information and/or information on a chroma QP offset list. For example, the information on the chroma QP offset may include the chroma QP offset list length information, and the information on the chroma QP offset list may be obtained based on the chroma QP offset list length information. The chroma QP offset list may include a chroma Cb QP offset list, a chroma Cr QP offset list, and/or a chroma CbCr QP offset list.

For example, the decoding apparatus may obtain a picture parameter set (PPS) syntax for the current picture. The image information may include the PPS syntax. The image information may be received through a bitstream. The PPS syntax may include information on the chroma QP offset list. That is, for example, the decoding apparatus may obtain information on the chroma QP offset list using the PPS syntax.

Herein, for example, the chroma QP offset list length information may specify a length of the chroma QP offset list. That is, for example, the chroma QP offset list length information may specify the number of offsets in the chroma QP offset list. For example, the chroma QP offset list length information may specify the number of pieces of information indicating an offset for an index in the chroma QP offset list. A syntax element of the chroma QP offset list length information may be the aforementioned pps_chroma_qp_offset_list_len_minus1 or pps_chroma_qp_offset_list_len.

In addition, for example, the information on the chroma QP offset list may include information indicating an offset for an index in the chroma QP offset list. A syntax element of the information indicating the offset for the index in the chroma QP offset list may be the aforementioned pps_cb_qp_offset_list[i], pps_cr_qp_offset_list[i], and pps_joint_cbcr_qp_offset_list[i].

Meanwhile, for example, the PPS syntax may not include chroma QP offset information. Herein, a chroma CP offset indicated by the chroma QP offset information may be called a PPS level chroma QP offset. That is, for example, the PPS syntax may not include information indicating the PPS level chroma QP offset. A syntax element of the chroma QP offset information may be pps_cb_qp_offset, pps_cr_qp_offset and/or pps_joint_cbcr_qp_offset.

The decoding apparatus obtains chroma QP offset index information for a current chroma block in the current picture (S610). The decoding apparatus may obtain chroma QP offset index information for the current chroma block in the current picture. The chroma QP offset index information may specify an index used to derive the chroma CP offset of the current chroma block in the chroma QP offset list. In addition, for example, a syntax element of the chroma QP offset index information may be the aforementioned cu_chroma_qp_offset_idx.

For example, the decoding apparatus may obtain a transform unit syntax and/or palette coding syntax for the current chroma block. The image information may include the transform unit and/or the palette coding syntax. The transform unit syntax and/or the palette coding syntax may include chroma QP offset index information for the current chroma block. That is, for example, the decoding apparatus may obtain the chroma QP offset index information by using the transform unit syntax and/or the palette coding syntax.

In addition, for example, the chroma QP offset index information may be obtained based on the chroma QP offset list length information. For example, when a value of the chroma QP offset list length information is greater than 1, the chroma QP offset index information may be obtained. That is, for example, when the value of the chroma QP offset list length information is greater than 1, the transform unit syntax and/or the palette coding syntax may include the chroma QP offset index information. Alternatively, for example, when the value of the chroma QP offset list length information is greater than 2, the chroma QP offset index information may be obtained. That is, for example, when the value of the chroma QP offset list length information is greater than 2, the transform unit syntax and/or the palette coding syntax may include the chroma QP offset index information.

Meanwhile, for example, a syntax element indicating a maximum cbSubdiv value of a coding unit in an intra slice in a current picture and a syntax element indicating a maximum cbSubdiv value of the intra slice in the current picture may be obtained based on the chroma QP offset list length information. For example, when the value of the chroma QP offset list length information is greater than 0, the syntax elements may be obtained. Alternatively, for example, when the value of the chroma QP offset list length information is greater than 1, the syntax elements may be obtained. The syntax elements may be included in a picture header syntax. Image information may include the picture header syntax.

In addition, for example, a chroma QP offset enable flag may be obtained based on the chroma QP offset list length information. The chroma QP offset enable flag may be included a slice header syntax. Image information may include the slice header syntax. For example, the chroma QP offset enable flag may specify whether a chroma QP offset is enabled for a current chroma block in a current slice. For example, the chroma QP offset enable flag may specify whether a chroma QP offset flag of the current chroma block may be present in a transform unit syntax and/or a palette coding syntax. In addition, the chroma QP offset flag may specify whether an entry in the chroma QP offset list is used to determine a chroma QP offset value. For example, when a value of the chroma QP offset list length information is greater than 0, the chroma QP offset enable flag may be obtained. That is, for example, when the value of the chroma QP offset list length information is greater than 0, the slice header syntax may include a chroma QP offset enable flag. Alternatively, for example, when the chroma QP offset list length information is greater than 1, a chroma QP offset enable flag may be obtained. That is, for example, when the value of the chroma QP list length information is greater than 1, the slice header syntax may include a chroma QP offset enable flag. For example, a syntax element of the chroma QP offset enable flat may be the aforementioned cu_chroma_qp_offset_enabled_flag. In addition, a syntax element of the chroma QP offset flag may be the aforementioned cu_chroma_qp_offset_flag.

The decoding apparatus derive a chroma QP offset for the current chroma block based on the information on the chroma QP offset and the chroma QP offset index information (S620). The decoding may derive the chroma QP offset for the current chroma block, based on the information on the chroma QP offset and the chroma QP offset index information. Herein, the chroma QP offset for the current chroma block may also be called a CU level chroma QP offset. For example, a chroma QP offset of an index indicated by the chroma QP offset index information in the chroma QP offset list may be derived.

For example, the chroma QP offset may be derived based on the following equation.

$$CuQpOffset_{cb}=pps\_cb\_qp\_offset\_list[!cu\_chroma\_qp\_offset\_flag?0:cu\_chroma\_qp\_offset\_idx+1]$$

$$CuQpOffset_{cr}=pps\_cr\_qp\_offset\_list[!cu\_chroma\_qp\_offset\_flag?0:cu\_chroma\_qp\_offset\_idx+1]$$

$$CuQpOffset_{CbCr}=ppsj\ oint\_cbcr\_qp\_offset\_list[!cu\_chroma\_qp\_offset\_flag?0:cu\_chroma\_qp\_offset\_idx+1]$$ [Equation 3]

Herein, $CuQpOffset_{Cb}$, $CuQpOffset_{Cr}$, and $CuQpOffset_{CbCr}$ may denote the chroma QP offset. For example, $CuQpOffset_{Cb}$ may denote a chroma QP offset for a chroma Cb component, $CuQpOffset_{Cr}$ may denote a chroma QP offset for a chroma Cr component, and $CuQpOffset_{CbCr}$ may denote a chroma QP offset for a joint CbCr component. In addition, for example, pps_cb_qp_offset_list[i], pps_cr_qp_offset_list[i], and pps_joint_cbcr_qp_offset_list[i] may denote an offset value corresponding to an index i in the chroma QP offset list. For example, $CuQpOffset_{Cb}$ may denote a chroma QP offset list for the chroma Cb component, $CuQpOffset_{Cr}$ may denote a chroma QP offset list for the chroma Cr component, and $CuQpOffset_{CbCr}$ may denote the chroma QP offset list for the joint CbCr component.

Alternatively, for example, the chroma QP offset may be derived based on the following equation.

$$CuQpOffset_{cb}=pps\_cb\_qp\_offset\_list[!cu\_chroma\_qp\_offset\_flag?0:cu\_chroma\_qp\_offset\_idx+2]$$

$$CuQpOffset_{cr}=pps\_cr\_qp\_offset\_list[!cu\_chroma\_qp\_offset\_flag?0:cu\_chroma\_qp\_offset\_idx+2]$$

$$CuQpOffset_{CbCr}=pps\_joint\_cbcr\_qp\_offset\_list[!cu\_chroma\_qp\_offset\_flag?0:cu\_chroma\_qp\_offset\_idx+2]$$ [Equation 4]

The decoding apparatus derives a chroma QP of the current chroma block based on the chroma QP offset (S630). The decoding apparatus may derive the chroma QP of the current chroma block, based on the chroma QP offset. For example, the decoding apparatus may derive the chroma QP of the current chroma block, based on a luma QP offset of a luma block for the current chroma block, a slice level chroma QP offset, and/or the chroma QP offset. For example, the chroma QP of the current chroma block may be derived without having to use a PPS level chroma QP offset. Herein, for example, the PPS level chroma QP offset may specify a chroma QP offset indicated by chroma QP offset information included in a PPS syntax.

For example, the chroma QP may be derived based on the following equation.

$$Qp'_{Cb}=Clip3(-QpBdOffset,63,qP_{Cb}+slice\_cb\_qp\_offset+CuQpOffset_{Cb})+QpBdOffset$$

$$Qp'_{Cr}=Clip3(-QpBdOffset,63,qP_{Cr}+slice\_cr\_qp\_offset+CuQpOffset_{Cr})+QpBdOffset$$

$$Qp'_{CbCr}=Clip3(-QpBdOffset,63,qP_{CbCr}+slice\_joint\_cbcr\_qp\_offset+CuQpOffset_{CbCr})+QpBdOffset$$ [Equation 5]

Herein, $Qp'_{Cb}$, $Qp'_{Cr}$, and $Qp'_{CbCr}$ may denote a chroma QP. For example, $Qp'_{Cb}$ may denote a chroma QP for a chroma Cb component, $Qp'_{Cr}$ may denote a chroma QP for the chroma Cr component, and $Qp'_{CbCr}$ may denote a chroma QP for a joint CbCr component. In addition, $qP_{Cb}$, $qP_{Cr}$, and $qP_{CbCr}$ may denote variables derived based on a luma QP offset as described above. In addition, for example, slice_cb_qp_offset, slice_cr_qp_offset, and slice_joint_cbcr_qp_offset may denote a slice level chroma QP offset. For example, slice_cb_qp_offset may denote a slice level chroma QP offset for the chroma Cb component, slice_cr_qp_offset may denote a slice level chroma QP offset for the chroma Cr component, and slicejoint_cbcr_qp_offset may denote a slice level chroma QP offset for the joint CbCr component. In addition, for example, $CuQpOffset_{Cb}$, $CuQpOffset_{Cr}$, and $CuQpOffset_{CbCr}$ may denote the chroma QP offset. For example, $CuQpOffset_{Cb}$ may denote a chroma QP offset for the chroma Cb component, $CuQpOffset_{Cr}$ may denote a chroma QP offset for the chroma Cr component, and $CuQpOffset_{CbCr}$ may denote a chroma QP offset for the joint CbCr component. In addition, for example, QpBdOffset may denote a chroma quantization parameter range offset.

The decoding apparatus derives a residual sample of the current chroma block, based on the chroma QP (S640). The decoding apparatus may derive the residual sample of the current block, based on the chroma QP. For example, the decoding apparatus may derive a transform coefficient of the current chroma block, based on residual information for the current chroma block, and may derive the residual sample by dequantizing the transform coefficient, based on the chroma QP. Image information may include the residual information for the current chroma block.

The decoding apparatus generates a reconstructed sample for the current chroma block based on the residual sample (S650). For example, the decoding apparatus may generate the reconstructed sample for the current chroma block and a reconstructed picture for the current picture, based on the residual sample.

Meanwhile, for example, the decoding apparatus may derive a prediction sample by performing an inter prediction mode or intra prediction mode for the current chroma block, based on prediction information received through a bitstream, and may generate the reconstructed sample and/or reconstructed picture through summation of the prediction sample and the residual sample.

Thereafter, optionally, an in-loop filtering procedure such as deblocking filtering, SAO, and/or ALF procedures may be applied to the reconstructed picture as described above in order to improve subjective/objective picture quality.

Figure 7:
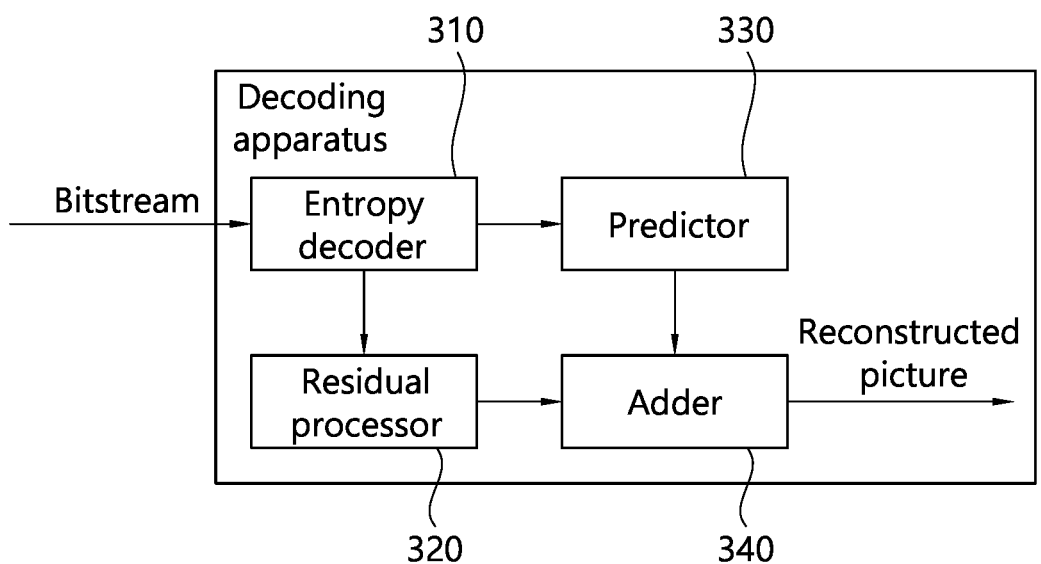
FIG. 7 schematically shows a decoding apparatus for performing an image decoding method according to this document.

FIG. 7 schematically shows a decoding apparatus for performing an image decoding method according to this document. The method disclosed in FIG. 6 may be performed by the decoding apparatus disclosed in FIG. 7. Specifically, for example, an entropy decoder of the decoding apparatus of FIG. 7 may perform S600 to S610 of FIG. 6, a residual processor of the decoding apparatus of FIG. 7 may perform S620 to S640 of FIG. 6, and an adder of the decoding apparatus of FIG. 7 may perform S650 of FIG. 6.

According to the aforementioned present document, a chroma QP offset of a current chroma block may be derived without having to signal chroma QP offset information in a PPS syntax, thereby reducing an amount of bits of information for deriving the chroma QP offset and improving coding efficiency.

In addition, according to the present document, information indicating a length of a chroma QP offset list may be signaled without an additional condition, thereby reducing an amount of bits of information for deriving the chroma QP offset and improving coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 8:
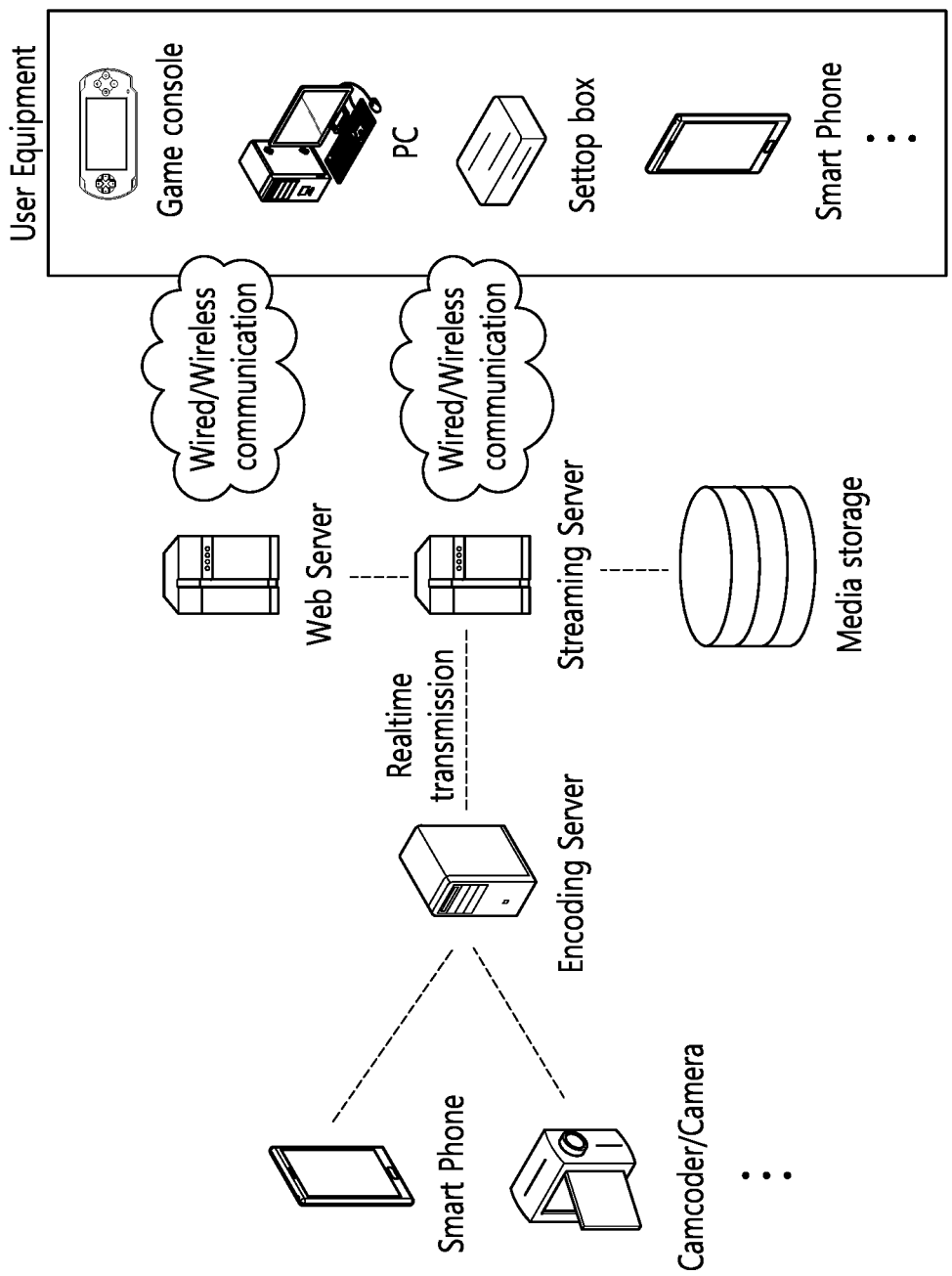
FIG. 8 illustrates a structural diagram of a contents streaming system to which the present disclosure is applied.

FIG. 8 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
   obtaining length information of a chroma Quantization Parameter (QP) offset list;
   obtaining chroma QP offset index information for a current chroma block based on the length information;
   deriving a chroma QP offset for the current chroma block based on the chroma QP offset index information;
   deriving a chroma QP of the current chroma block based on the chroma QP offset;
   deriving a residual sample of the current chroma block based on the chroma QP; and
   generating a reconstructed sample of the current chroma block based on the residual sample,
   wherein the length information is related to a number of QP offset list for Cb, a number of QP offset list for Cr and a number of QP offset list for joint CbCr,
   wherein the QP offset list for the joint CbCr is signaled based on joint CbCr QP offset present flag being 1,
   wherein the chroma QP is derived based on a following equation:

$$Qp'_{Cb}=Clip3(-QpBdOffset,63,qP_{Cb}+slice\_cb\_qp\_offset+CuQpOffset_{Cb})+QpBdOffset$$

$$Qp'_{Cr}=Clip3(-QpBdOffset,63,qP_{Cr}+slice\_cr\_qp\_offset+CuQpOffset_{Cr})+QpBdOffset$$

$$Qp'_{CbCr}=Clip3(-QpBdOffset,63,qP_{CbCr}+slice\_joint\_cbcr\_qp\_offset+CuQpOffset_{CbCr})+QpBdOffset$$

and
   wherein, $Qp'_{Cb}$, $Qp'_{Cr}$, $Qp'_{CbCr}$ represent the chroma QP, $qP_{Cb}$, $qP_{Cr}$, and $qP_{CbCr}$ represent variables derived based on a luma QP offset of a luma block for the current chroma block, slice cb qp offset, slice cr qp offset, slice joint cbcr qp offset represent a slice level chroma QP offset, and $CuQpOffset_{Cb}$, $CuQpOffset_{Cr}$, $CuQpOffset_{CbCr}$ represent the chroma QP offset.

2. The method of claim 1, wherein when a value of the length information of the chroma QP offset list is greater than 1, the chroma QP offset index information is obtained.

3. The method of claim 1, wherein when a value of the length information of the chroma QP offset list is greater than 2, the chroma QP offset index information is obtained.

4. The method of claim 1, wherein the chroma QP offset index information is included in a transform unit syntax.

5. The method of claim 1, wherein the chroma QP offset index information is included in a palette coding syntax.

6. The method of claim 1, wherein the chroma QP is derived without using a PPS level chroma QP offset.

7. The method of claim 1, wherein a chroma QP offset enable flag is obtained based on the length information of the chroma QP offset list, and
   wherein the chroma QP offset enable flag is a flag for whether the chroma QP offset is enabled for the current chroma block.

8. The method of claim 7, wherein the chroma QP offset enable flag is included in a slice header syntax.

9. An image encoding method performed by an encoding apparatus, the method comprising:
   generating length information of a chroma Quantization Parameter (QP) offset list;
   generating chroma QP offset index information for a current chroma block based on the length information; and
   encoding image information including the chroma QP offset index information and the length information,
   wherein the length information is related to a number of QP offset list for Cb, a number of QP offset list for Cr and a number of QP offset list for joint CbCr,
   wherein the QP offset list for the joint CbCr is signaled based on joint CbCr QP offset present flag being 1,
   wherein the chroma QP is derived based on a following equation:

$$Qp'_{Cb}=Clip3(-QpBdOffset,63,qP_{Cb}+slice\_cb\_qp\_offset+CuQpOffset_{Cb})+QpBdOffset$$

$$Qp'_{Cr}=Clip3(-QpBdOffset,63,qP_{Cr}+slice\_cr\_qp\_offset+CuQpOffset_{Cr})+QpBdOffset$$

$$Qp'_{CbCr}=Clip3(-QpBdOffset,63,qP_{CbCr}+slice\_joint\_cbcr\_qp\_offset+CuQpOffset_{CbCr})+QpBdOffset$$

and
   wherein, $Qp'_{Cb}$, $Qp'_{Cr}$, $Qp'_{CbCr}$ represent the chroma QP, $qP_{Cb}$, $qP_{Cr}$, and $qP_{CbCr}$ represent variables derived based on a luma QP offset of a luma block for the current chroma block, slice cb qp offset, slice cr qp offset, slice joint cbcr qp offset represent a slice level chroma QP offset, and $CuQpOffset_{Cb}$, $CuQpOffset_{Cr}$, $CuQpOffset_{CbCr}$ represent the chroma QP offset.

10. A method for transmitting data for an image, the method comprising:
    obtaining a bitstream for the image, wherein the bitstream is generated based on generating length information of a chroma Quantization Parameter (QP) offset list, generating chroma QP offset index information for a current chroma block based on the length information, and encoding image information including the chroma QP offset index information and the length information; and
    transmitting the data comprising the bitstream,
    wherein the length information is related to a number of QP offset list for Cb, a number of QP offset list for Cr and a number of QP offset list for joint CbCr,
    wherein the QP offset list for the joint CbCr is signaled based on joint CbCr QP offset present flag being 1,
    wherein the chroma QP is derived based on a following equation:

$$Qp'_{Cb}=Clip3(-QpBdOffset,63,qP_{Cb}+slice\_cb\_qp\_offset+CuQpOffset_{Cb})+QpBdOffset$$

$$Qp'_{Cr}=Clip3(-QpBdOffset,63,qP_{Cr}+slice\_cr\_qp\_offset+CuQpOffset_{Cr})+QpBdOffset$$

$$Qp'_{CbCr}=Clip3(-QpBdOffset,63,qP_{CbCr}+slice\_joint\_cbcr\_qp\_offset+CuQpOffset_{CbCr})+QpBdOffset$$

and
    wherein, $Qp'_{Cb}$, $Qp'_{Cr}$, $Qp'_{CbCr}$ represent the chroma QP, $qP_{Cb}$, $qP_{Cr}$, and $qP_{CbCr}$ represent variables derived based on a luma QP offset of a luma block for the current chroma block, slice cb qp offset, slice cr qp offset, slice joint cbcr qp offset represent a slice level chroma QP offset, and CuQpOffsetcb, CuQpOffsetcr, CuQpOffsetcbCr represent the chroma QP offset.

\* \* \* \* \*